United States Patent
Cappiello

(10) Patent No.: US 10,261,297 B2
(45) Date of Patent: Apr. 16, 2019

(54) METHOD AND APPARATUS FOR REMOTE IMAGING

(71) Applicant: Massachusetts Institute of Technology, Cambridge, MA (US)

(72) Inventor: Gregory G. Cappiello, Windham, NH (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 15/634,428

(22) Filed: Jun. 27, 2017

(65) Prior Publication Data

US 2018/0373005 A1    Dec. 27, 2018

(51) Int. Cl.
| | |
|---|---|
| G02B 17/08 | (2006.01) |
| G02B 23/02 | (2006.01) |
| G02B 7/182 | (2006.01) |

(52) U.S. Cl.
CPC ......... *G02B 17/0852* (2013.01); *G02B 7/182* (2013.01); *G02B 17/0808* (2013.01); *G02B 23/02* (2013.01)

(58) Field of Classification Search
CPC ............ G02B 17/0808; G02B 17/0824; G02B 17/084; G02B 17/0852; G02B 17/004; G02B 17/08; G02B 17/0804; G02B 7/182; G02B 23/02; G02B 23/06
USPC ................................ 359/399, 729, 731–732
See application file for complete search history.

(56) References Cited

U.S. PATENT DOCUMENTS

| | | | |
|---|---|---|---|
| 3,752,559 A | 8/1973 | Fletcher et al. | |
| 5,089,910 A | 2/1992 | Sigler | |
| 6,667,831 B2 | 12/2003 | Draganov et al. | |
| 7,236,297 B1 * | 6/2007 | Ackermann | G02B 17/0808 359/364 |
| 2004/0246595 A1 * | 12/2004 | Beach | G02B 17/0804 359/728 |
| 2005/0129082 A1 | 6/2005 | Poppe et al. | |
| 2010/0284099 A1 | 11/2010 | Guyer | |

(Continued)

OTHER PUBLICATIONS

"8.2. All-Reflecting Two-Mirror Telescopes," retrieved from the Internet URL: https://www.telescope-optics.net/two-mirror.htm [retrieved on Apr. 24, 2017].

(Continued)

*Primary Examiner* — Jordan M Schwartz
(74) *Attorney, Agent, or Firm* — Hamilton, Brook, Smith & Reynolds, P.C.

(57) ABSTRACT

A remote imaging apparatus, and corresponding method, includes a hyperbolic primary mirror that receives light from a remote object to be imaged. The primary mirror has a continuous surface that reflects, at least twice, the light from the remote object. The apparatus also includes a hyperbolic secondary mirror having a continuous surface that reflects, at least twice, the light from the remote object. The secondary mirror delivers the light to a field corrector via a port of the hyperbolic primary mirror, and the field corrector is configured to correct for an optical aberration of one or both of the hyperbolic primary and secondary mirrors. Embodiments can provide low distortion, small aspect ratios, and small form factors and moments of inertia for fleets satellite-based and other imaging systems.

19 Claims, 19 Drawing Sheets

(9 of 19 Drawing Sheet(s) Filed in Color)

(56) References Cited

U.S. PATENT DOCUMENTS

2012/0134030 A1     5/2012  Weissman
2012/0176671 A1*    7/2012  Cook ................. G02B 17/0808
                                                              359/365

OTHER PUBLICATIONS

Cheng, J., "Chapter 2: Mirror Design for Optical Telescopes," *The Principles of Astronomical Telescope Design*, Astrophysics and Space Science Library, 87-139 (2009).
Jones, L., "Reflective and Catadioptric Objectives," *Optical Instruments*, 18.1-18.45, (1995).
Piquepaille, R., "An 'origami lens' for your camera phone?," [Jan. 31, 2007], retrieved from the Internet URL: https://www.zdnet.com/article/an-origami-lens-for-your-camera-phone/ [retrieved Apr. 24, 2017].
"Radiation Resistant Glasses," retrieved from the Internet URL: http://www.schott.com/advanced_optics/english/products/optical-materials/optical-glass/radiation-resistant-glasses/index.html [retrieved Jul. 12, 2017].
Wilson, R. N., "Wide-field telescopes," *Reflecting Telescope Optics I: Basic Design Theory and its Historical Development*, Chapter 3.6, p. 231 (2013).
International Search Report and Written Opinion, issued in International Application No. PCT/US2017/039500, entitled "Remote Imaging Apparatus," dated Apr. 27, 2018.

\* cited by examiner

| # | Surf:Type | Comment | Radius | Thickness | Material | Coating | Semi-Diameter | Chip Zone | Mean Semi-Di | Conic | TCE x 1E-6 | Decenter X | Decenter Y | Tilt About X | Tilt About Y | Tilt About Z |
|---|---|---|---|---|---|---|---|---|---|---|---|---|---|---|---|---|
| 0 | OBJEC | Standard | Infinity | Infinity | | | | | | 0.000000 | 0.000000 | | | | | |
| 1 | STOP | Standard | Infinity | 693.0000000 | | | 350.0000000 | 0.0000000 | 350.00000 | 0.000000 | 0.0000000 | | | | | |
| 2 | | Standard | -990.9696236 V | -673.5081253 V | | | 351.3962615 | 0.0000000 | 351.39624 | -1.025921.. V | 0.0000000 | | | | | |
| 3 | | Standard | 655.6986625 V | -673.5081253 P | MIRROR | | 115.2697580 | 0.0000000 | 115.25975.. | -1.165719.. V | 0.0000000 | | | | | |
| 4 | | Standard | -990.9696236 P | -673.5081253 P | MIRROR | | 112.9431281 | 0.0000000 | 114.9431 2.. | -1.025921.. P | 0.0000000 | | | | | |
| 5 | | Standard | 655.6986625 P | 673.5081253 P | MIRROR | | 36.8954545 | 0.0000000 | 36.895465.. | -1.165719.. P | 0.0000000 | | | | | |
| 6 | | Standard | Infinity | 140.0000000 | | | 34.4002673 | 0.0000000 | 34.400226 | 0.000000 | 0.0000000 | | | | | |
| 7 | | Coordinate Break | | 0.0000000 | | | 0.0000000 | | | | | 0.0000000 | 0.0000000 | 45.000000 | 0.000000 | 0.000000 |
| 8 | | Standard | Infinity | 0.0000000 | MIRROR | | 42.1014754 | 0.0000000 | 48.101474 | 0.000000 | 0.0000000 | | | | | |
| 9 | | Coordinate Break | | 0.0000000 | | | 0.0000000 | | | | | 0.0000000 | 0.0000000 | 45.000000 P | 0.000000 P | 0.000000 |
| 10 | | Standard | Infinity | 0.0000000 P | | | 0.0000000 U | 0.0000000 | 0.0000000 | 0.000000 | 0.0000000 | | | | | |
| 11 | | Standard | Infinity | -140.0000000 P | | | 0.0000000 U | 0.0000000 | 0.0000000 | 0.000000 | 0.0000000 | | | | | |
| 12 | | Coordinate Break | | -147.0000000 | | | 0.0000000 | | | | | 0.0000000 | 0.0000000 | 0.000000 | 22.500000 | 0.000000 |
| 13 | | Standard | Infinity | 0.0000000 | MIRROR | | 32.8386142 | 0.0000000 | 32.838631.. | 0.000000 | 0.0000000 | | | | | |
| 14 | | Coordinate Break | | 0.0000000 | | | 0.0000000 | | | | | 0.0000000 | 0.0000000 | 0.000000 P | 22.500000 P | 0.000000 |
| 15 | | Standard | Infinity V | 135.3632259 V | | | 0.0000000 U | 0.0000000 | 0.0000000 | 0.000000 | 0.0000000 | | | | | |
| 16 | | Standard | 112.8520163 V | 27.9802597 V | F_SILICA | | 32.3275780 | 0.0000000 | 32.327578.. | 0.000000 | 0.0000000 | | | | | |
| 17 | | Standard | 165.5696587 V | 47.5328351 V | | | 28.7968208 | 0.0000000 | 32.327578.. | 0.000000 | 0.0000000 | | | | | |
| 18 | | Standard | -138.8342422 V | 11.3846286 V | F_SILICA | | 29.4651649 | 0.0000000 | 39.535387.. | 0.000000 | 0.0000000 | | | | | |
| 19 | | Standard | 227.9474115 V | 12.4589485 V | | | 30.5350672 | 0.0000000 | 39.535387.. | 0.000000 | 0.0000000 | | | | | |
| 20 | IMAG | Standard | Infinity | | | | 12.5552898 | 0.0000000 | 12.155520 | 0.000000 | 0.0000000 | | | | | |

FIG. 5

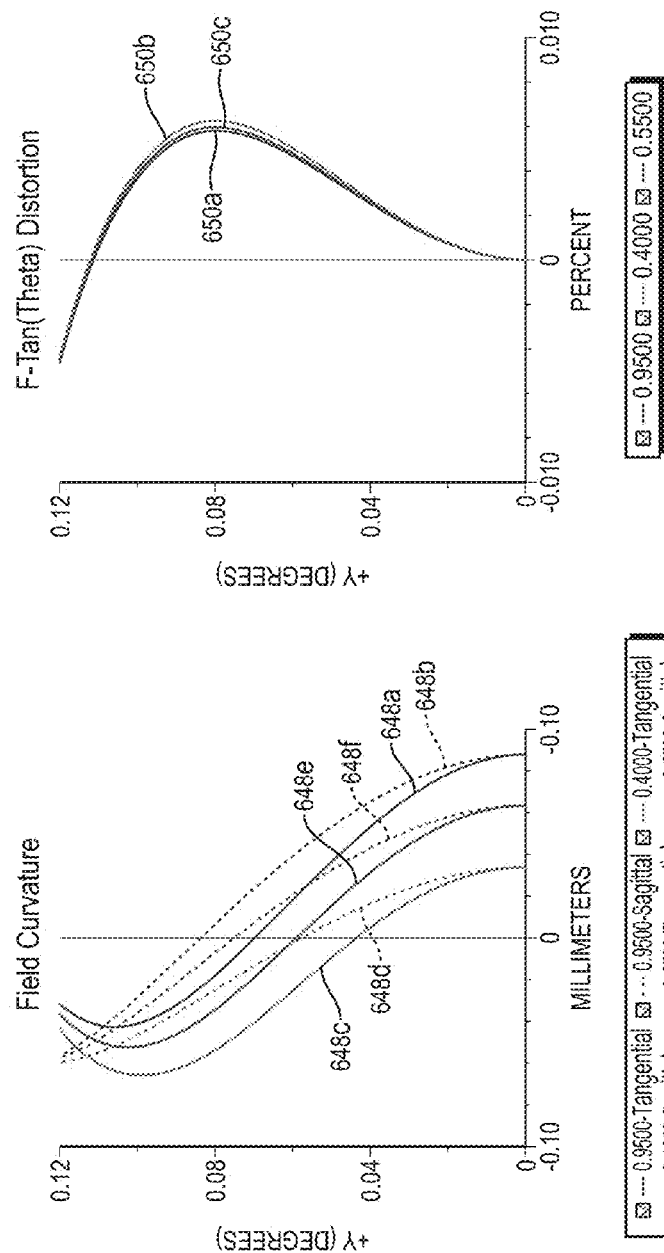

| | Surf:Type | Comment | Radius | Thickness | Material | Coating | Clear Semi-Dia | Chip Zone | Mean Semi-Dia | Conic | TCE x 1E-6 | Par 1(unused) | Par 2(unused) | Par 3(unused) |
|---|---|---|---|---|---|---|---|---|---|---|---|---|---|---|
| 0 OBJEC | Standard ▼ | | Infinity | Infinity | | | Infinity | 0.0000000 | Infinity | 0.0000000 | 0.0000000 | | | |
| 1 | Standard ▼ | | Infinity | 0.0000000 | | | 100.0000000 | 0.0000000 | 100.0000... | 0.0000000 | 0.0000000 | | | |
| 2 STOP | Standard ▼ | | Infinity | 100.0000000 | | | 100.0000000 | 0.0000000 | 100.0000... | 0.0000000 | 0.0000000 | | | |
| 3 | Standard ▼ | | -225.53761423 | -86.15637293 V | MIRROR | | 100.13576261 | 0.0000000 | 100.13576... | -1.01450997 V | 0.0000000 | | | |
| 4 | Standard ▼ | | -53.63635160 V | -86.15637293 P | MIRROR | | 23.95484026 | 0.0000000 | 23.954840... | -1.09256894 V | 0.0000000 | | | |
| 5 | Standard ▼ | | -225.53761423 P | -86.15637293 P | MIRROR | | 23.99002022 | 0.0000000 | 23.990020... | -1.01450997 P | 0.0000000 | | | |
| 6 | Standard ▼ | | -53.63635160 P | -86.15637293 P | MIRROR | | 5.69738849 | 0.0000000 | 5.69738649 | -1.09256894 P | 0.0000000 | | | |
| 7 | Standard ▼ | | Infinity | 30.0000000 | | | 5.69820627 | 0.0000000 | 5.69820627 | 0.0000000 | 0.0000000 | | | |
| 8 | Coordinate Break ▼ | | | 0.0000000 | | | 0.0000000 | | | | | 0.0000000 | 0.0000000 | 45.0000... |
| 9 | Standard ▼ | | Infinity | 0.0000000 | MIRROR | | 8.05965810 | 0.0000000 | 8.05965810 | 0.0000000 | 0.0000000 | | | |
| 10 | Coordinate Break ▼ | | | -10.0000000 | | | 0.0000000 | | | | | 0.0000000 | 0.0000000 | 45.0000... P |
| 11 | Standard ▼ | | -9.52679082 V | -6.0000000 V | SAPPHIRE | | 5.68860250 | 0.0000000 | 5.68860250 | 0.0000000 | 0.0000000 | | | |
| 12 | Standard ▼ | | -7.12270953 V | -2.28654998 V | | | 4.09104855 | 0.0000000 | 5.68860250 | 0.0000000 | 0.0000000 | | | |
| 13 | Standard ▼ | | 8.89575109 V | -10.0000000 V | SAPPHIRE | | 4.09105013 | 0.0000000 | 6.13869074 | 0.0000000 | 0.0000000 | | | |
| 14 | Standard ▼ | | 32.52311071 V | 49.25771262 V | | | 6.13869074 | 0.0000000 | 6.13869074 | 0.0000000 | 0.0000000 | | | |
| 15 | Standard ▼ | | Infinity | -10.0000000 V | | | 16.10459951 | 0.0000000 | 16.104569... | 0.0000000 | 0.0000000 | | | |
| 16 IMA | Standard ▼ | | Infinity | | | | 18.10548812 | 0.0000000 | 18.105408... | 0.0000000 | 0.0000000 | | | |

METHOD AND APPARATUS FOR REMOTE IMAGING

GOVERNMENT SUPPORT

This invention was made with Government support under Contract No. FA8721-05-C-0002 awarded by the U.S. Air Force. The Government has certain rights in the invention.

BACKGROUND

Cassegrain telescopes typically include a combination of two mirrors, a primary mirror that is concave, and a secondary mirror that is convex. Light is typically received at the primary mirror, which may be parabolic, and reflected to the secondary mirror, which is typically hyperbolic. The secondary mirror typically reflects the light back through a cavity between the two mirrors, and the light exits the cavity through a hole in the primary mirror. Image formation is completed at a point behind the primary mirror by using an eyepiece or a camera, for example. Some Cassegrain-class designs have included a primary mirror that is hyperbolic for the purpose of increased performance. The two-reflection Cassegrain telescope has the advantage of a longer focal length, corresponding to slower optics, to achieve a telephoto effect. In particular, the reflection from the convex secondary mirror adds to the telephoto effect by increasing focal length of the system. Cassegrain telescopes, therefore, with a single reflection from each of the primary and secondary mirrors, can provide a smaller overall telescope length than would otherwise be possible with a given focal length and telephoto effect.

SUMMARY

Cassegrain-type telescopes have a disadvantage in that they are still much longer than they are wide. For example, a Cassegrain telescope may have a length that is 2 to 3 times or more larger than the diameter of the primary mirror. For a given optical performance, therefore, the form factor of typical Cassegrain-type telescopes limits the feasibility for satellite launch, for example, in today's satellite launch vehicles. Furthermore, the form factor described above has a much larger angular inertia than is desirable for certain applications that involve telescope pointing or variable beam directing.

Some telescope designs have been proposed to use two reflections from one or both sides of the telescope using one or more nested mirror pairs. Nested mirrors, with a primary or secondary side of a reflecting telescope of two different, nested mirror surfaces with different curvature functions, can be used to correct for distortion that cannot otherwise be corrected using two reflections from a given mirror having the same curvature. However, increasing the number of mirrors and curvature functions in a reflective telescope increases design complexity and difficulty of manufacture for various reasons. Among other factors, multiple nested mirrors must be precision crafted, mounted and aligned with respect to each other in the presence of a large number of degrees of freedom for the system corresponding to the increased number of mirrors. Furthermore, use of nested mirrors can significantly increase the cost of the system due to the greater number of high-precision mirrors required, along with the increased complexity of design and manufacturing.

"Origami" mirrors, which are Fresnel-type mirrors, have also been proposed for the purpose of limiting length of camera systems, for example, while still providing low distortion where a high telephoto effect is desirable. However, "origami"-type optics are very expensive, in that they must be diamond turned and hand polished. These optics, therefore, as well as nested mirror pairs, may be unsuitable for cost-sensitive applications or where many optical systems are desired to be used.

Described herein are embodiment remote imaging apparatus and methods that use a combination of hyperbolic primary and secondary mirrors, each having a continuous, single surface that is configured to reflect, at least twice, light from a remote object to be imaged. The combination of hyperbolic primary and secondary mirrors can be combined with an external field corrector outside of a cavity formed by the two mirrors for extremely low distortion, combined with greatly increased magnification, as well as very small aspect ratio and angular inertia of a telescope imaging apparatus.

Embodiments described herein have the advantage that each mirror surface is contiguous, with no change in prescription or mirror curvature function from the first reflection to the second reflection at each mirror. Only two mirrors need to be aligned, even with four reflections, which is an additional factor lowering the cost of embodiment remote imaging and beam expander apparatuses. This can significantly increase feasibility for cost-sensitive applications, such as deployment of a large fleet of small, high-performance imagers that are satellite-based or aircraft-based, for example. A further advantage of embodiments is significantly decreased aspect ratio and angular inertia. Aspect ratios of example embodiments can be 1.0 or lower, for example. This enables compact, high performance, well-corrected satellite imagers to be deployed using existing launch vehicles, and it is even feasible for more than one telescope including embodiment elements to be launched using the same satellite launch vehicle. The smaller moment of inertia of embodiment apparatuses can enable a remote imaging or beam director apparatus, or an embodiment tracking or beam director system, to converge on a target more quickly and to be rotationally controlled with greater ease and lower expense.

In one embodiment, a remote imaging apparatus includes a hyperbolic primary mirror configured to receive light from a remote object to be imaged. The hyperbolic primary mirror has a continuous surface configured to reflect, at least twice, the light from the remote object to be imaged. The apparatus also includes a hyperbolic secondary mirror arranged with an orientation relative to the hyperbolic primary mirror. The hyperbolic secondary mirror has a continuous surface configured to reflect, at least twice, the light from the remote object to be imaged, and the hyperbolic secondary mirror is further configured to deliver the light to a field corrector. The field corrector is arranged to receive the light reflected from the hyperbolic secondary mirror via a port of the hyperbolic primary mirror, and the field corrector is also configured to correct for an optical aberration of one or both of the hyperbolic primary and secondary mirrors. Optical aberrations for which the field corrector may be configured to correct include Petzval field curvature, astigmatism, distortion, coma, and combinations of two or more of these.

The remote imaging apparatus can be defined further by an aspect ratio of a mirror separation between the respective continuous surfaces of the primary and secondary mirrors, divided by a diameter of the hyperbolic primary mirror. The aspect ratio can be in a range of about 0.3 to about 3.0, in a range of about 0.3 to about 2.0, in a range of about 0.3 to about 1.2, or in a range of about 0.8 to about 1.2. The apparatus can be further defined by an f-number between about f/8 and about f/100. The f-number can also be between about f/13 and about f/25.

The hyperbolic primary and secondary mirrors and the field corrector together can be configured to output a diffraction-limited image of the remote object. The field corrector can be configured to impart a telephoto magnification to an image of the object to be imaged. The field corrector can be a two-lens corrector, a three-lens corrector, four-lens corrector, a sapphire doublet, or an achromatic triplet. The field corrector can include a fused-silica or radiation-hardened glass material.

The apparatus can also include one or more folding mirrors configured to fold the light from the remote object in an optical path between the hyperbolic secondary mirror and the field corrector. The apparatus can further include a pixel array arranged to receive the light from the field corrector to capture an image of the remote object to be imaged.

The hyperbolic primary mirror can have an input aperture in a range of between about 100 mm and about 5 m. The input aperture can also be in a range of between about 200 mm to about 5 m, about 300 mm to about 5 m, about 2 m to about 3 m, about 100 mm to about 500 mm, or about 100 mm to about 300 mm. The apparatus can have a field of view (FOV) in a range of about 0.1° to about 0.5°. The apparatus can also have an effective focal length (EFL) in a range of about 7 meters (m) to about 15 m.

The apparatus can have an F-Tan (Theta) distortion within a range of about 0.001% to about 3% over a wavelength range of 400-2100 nm (nm). The distortion over this wavelength range can also be within a range of about 0.005% to about 1% or in a range of about 0.2% to about 1%, or in a range of about 0.006% to about 0.2%.

A tracking system can include the embodiment remote imaging apparatus described above. The tracking system can also include one or more actuators configured to slew the apparatus angularly for repeated imaging of the remote object, with relative motion between the remote object and the tracking system.

In another embodiment, a beam expander apparatus includes a parabolic primary mirror having a continuous surface configured to reflect, at least twice, a light beam. The parabolic primary mirror is further configured to deliver the light beam, in an expanded form, to a target object. The beam expander apparatus also includes a parabolic secondary mirror arranged with an orientation relative to the parabolic primary mirror. The parabolic secondary mirror has a continuous surface configured to reflect, at least twice, the light beam, and the parabolic secondary mirror is further configured to receive the light beam via a port of the parabolic primary mirror.

Each of the parabolic primary and secondary mirrors can be further configured to reflect the light beam at least three times.

The beam expander apparatus can be further defined by an aspect ratio of a mirror separation between the respective continuous surfaces of the primary and secondary parabolic mirrors divided by a diameter of the parabolic primary mirror. The aspect ratio can be in a range of about 0.3 to about 3.0, in a range of about 0.3 to about 2.0, in a range of about 0.3 to about 1.2, or in a range of about 0.8 to about 1.2.

A beam director system can include the beam expander apparatus described above. The beam director system can further include one or more actuators configured to slew the beam expander apparatus angularly for repeated directing of the light beam in expanded form toward the target object, with relative motion between the beam director system and the target object.

In yet another embodiment, a method of remote imaging includes receiving, at a hyperbolic primary mirror having a continuous surface, light from a remote object to be imaged. The method also includes reflecting, at least twice, at the hyperbolic primary mirror, the light from the remote object to be imaged. The method also includes reflecting, at least twice, at a hyperbolic secondary mirror having a continuous surface, the light from the remote object to be imaged. The method still further includes delivering the light from the hyperbolic secondary mirror, via a port of the hyperbolic primary mirror, to a field corrector configured to correct for an optical aberration of one or both of the hyperbolic primary and secondary mirrors.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 is a table showing a Zemax® design prescription for the remote imaging apparatus illustrated in FIG. 4.

FIG. 6A is a graph illustrating field curvature calculated by Zemax® for the embodiment remote imaging apparatus illustrated in FIG. 4.

FIG. 6B is a graph illustrating F-Tan (Theta) distortion as a function of field angle for the field of view of the embodiment remote imaging apparatus illustrated in FIG. 4.

FIG. 10 is a table showing a Zemax® design prescription for the apparatus illustrated in FIG. 9.

FIG. 15 is a table showing a Zemax® design prescription for the remote imaging apparatus illustrated in FIGS. 14A-14B.

DETAILED DESCRIPTION

A description of example embodiments of the invention follows.

Figure 1:
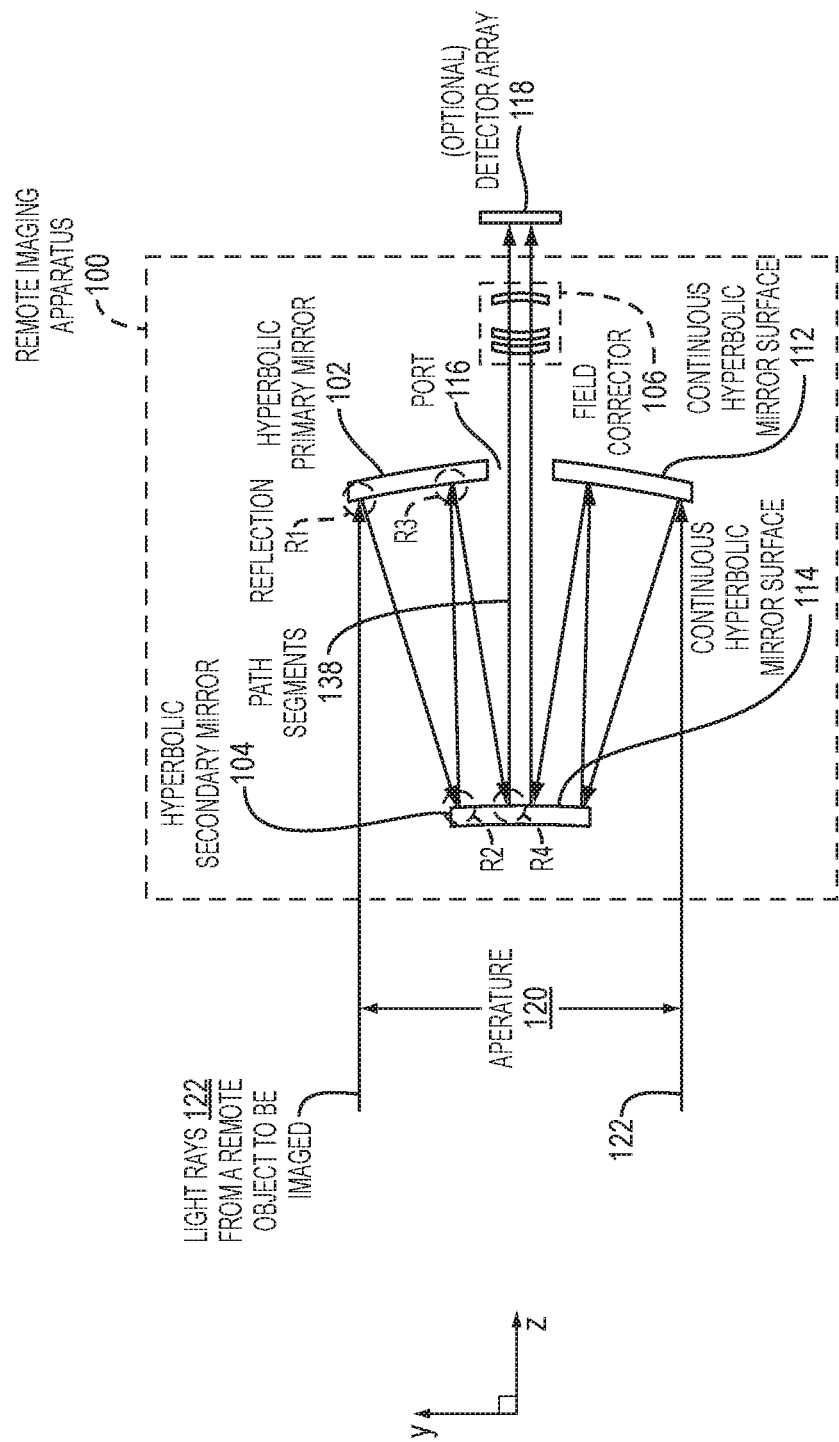
FIG. 1 is a cross-sectional diagram illustrating an embodiment remote imaging apparatus including hyperbolic primary and secondary mirrors, each arranged to reflect light from a remote image at least twice, and an external field corrector.

FIG. 1 is a cross-sectional diagram illustrating an embodiment remote imaging apparatus 100. The apparatus 100 includes a hyperbolic primary mirror 102 that is configured to receive light rays 122 from a remote object to be imaged. The hyperbolic primary mirror has a continuous hyperbolic mirror surface 112 that is configured to reflect, at least twice, the light from the remote object to be imaged. The apparatus 100 also includes a hyperbolic secondary mirror 104 arranged with an orientation relative to the hyperbolic primary mirror 102.

In the apparatus 100, the relative orientation between the primary and secondary mirrors 102 and 104 results in a cavity being formed between them, such that the light rays 122 from the remote object (not shown in FIG. 1) can be received at the primary mirror 102 and reflected twice by each of the mirrors 102 and 104 before exiting the cavity through a port 116 in the primary mirror 102. The secondary mirror 104 also has a continuous hyperbolic mirror surface 114 that is configured to reflect, at least twice, the light 116 from the remote object. The secondary mirror 104 is configured to deliver the light 122 to an external field corrector 106 upon the second reflection from the mirror 114, and this delivery is through the port 116. The cavity is defined by the space between the reflective mirror surfaces 112 and 114, which face each other, and between the reflections R1 and R2, and further between the reflections R3 and R4. In view of the disclosure herein, a person of ordinary skill in the art of telescope design and manufacture would understand how to manufacture and align the hyperbolic mirrors and the field corrector such that all optics share a common optical axis and are aligned to minimize optical aberrations.

Reflections of a given light ray 122 are labeled for further specificity in FIG. 1. A first reflection R1 of the incoming light ray 122 occurs at the primary mirror 102. The first reflection R1 results in the light ray 122 being received at the secondary mirror 104. The secondary mirror 104 reflects the light ray 122 (reflection R2), constituting a first reflection at the secondary mirror and the second reflection in the overall apparatus. After the second reflection R2, the light ray 122 is delivered to, and received at, the primary mirror 102 once again, where a third apparatus reflection R3 (second reflection from the primary mirror 102) occurs. The third reflection R3 results in the light ray 122 being delivered back to, and received at, the secondary mirror 104 a second time, which results in a fourth apparatus reflection R4 in (second reflection from the secondary mirror 104). The reflection R4 results in the light ray 122 being delivered outside of the interior cavity formed between the mirrors 102 and 104 and toward the field corrector 106. This delivery of light to the external field corrector is via an optical path segment 138 between the fourth apparatus reflection R4 at the secondary mirror 104 and the field corrector 106. The apparatus can be configured such that each of the primary and secondary mirrors reflects the light more than twice, such that there are a total of six or eight mirror reflections within the cavity, for example.

Each of the mirrors 102 and 104 is "hyperbolic" because it has a reflective surface 112 or 114, respectively, that has curvature defined by a hyperbolic function, as is understood in the art of mathematics, and more particularly in the art of reflector telescope optics. As used herein, the term "continuous" is defined to mean that the hyperbolic mirror surfaces 112 and 114 are each uninterrupted hyperbolic surfaces and that all points where relevant light rays are reflected are on the same mirror surface, with the same uninterrupted area across the two reflections. Both reflections from each surfaces 112 or 114 occur on the same mirror surface.

The surfaces 112 and 114 are "continuous" because the areas of each surface 112 or 114 over which the two reflections occur are characterized by a single, hyperbolic function. For example, as to the primary mirror 102 and its continuous surface 112, both reflections R1 and R3 occur on the same surface, characterized by the same hyperbolic curvature function. Likewise, as to the secondary mirror 104 and its continuous surface 114, both of the reflections R2 and R4 from the secondary mirror surface occur at the same surface, characterized by the same hyperbolic curvature function. Accordingly, even though an inner rim of the primary mirror 102 forms the open port 116 toward the center thereof, a perspective illustration of the mirror 102, shown in FIG. 2B, illustrates that both the upper and lower portions of the mirror 102 shown in the cross-sectional view in FIG. 1 are actually parts of the same continuous mirror surface. Example existing mirror surfaces that are not continuous are illustrated in FIGS. 3A-3D, as described hereinafter.

The field corrector 106 is external to the cavity between the reflective surfaces 112 and 114. Accordingly, the field corrector is also referred to as an "external" field corrector. The field corrector 106 is arranged to receive the light rays 122 that are reflected from the hyperbolic secondary mirror 104 via the port 116 in the hyperbolic primary mirror 102. The field corrector is configured to correct for an optical aberration of one or both of the hyperbolic primary and secondary mirrors. The optical aberration of mirrors for which the field corrector may be configured to correct can include third- and higher-order Petzval Field Curvature, astigmatism, distortion, coma, and combinations of two or more of these. Example field correctors can include a two-lens corrector, as shown in FIG. 5, or a three-lens corrector, as illustrated in FIG. 1, a sapphire doublet, or an achromatic triplet. Field correctors such as these are outlined in reference texts such as Chapter 9 of Astronomical Optics by Daniel Schroeder and Sections 13 and 14 of Telescope Optics by Rutten and Van Venrooij, both references of which are hereby incorporated by reference in their entireties. A guiding principle of these correctors is to add negative Petzval curvature or astigmatism to yield a flatter field of good focus quality. With these considerations in mind, and further in view of the other disclosure herein, it would be apparent to a person of ordinary skill in the art how to select an external lens corrector design for a given telescope mirror design and application.

The apparatus 100 has an aperture 120 that is defined by the diameter of the hyperbolic primary mirror 102, which is the aperture diameter over which the apparatus 100 can receive and process the light rays 122, including reflections by the mirror combination and refraction through the field corrector to be detected at an imager, such as the detector array 118. In some embodiments, an overall apparatus aperture is smaller than the full diameter of the primary mirror due to baffling of optical components of the apparatus. Nonetheless, it is desirable to design the primary mirror to be as close as possible to a given overall apparatus aperture in order to minimize cost, size, and aspect ratio of an overall telescope design.

In some embodiments, the input aperture is in a range of between about 100 mm and about 5 m. The input aperture may also be further limited to a range of about 200 mm to about 5 m, a range of about 300 mm to about 5 m, a range of about 2 m to about 3 m, a range of about 100 mm to about 500 mm, or a range of about 100 mm to about 300 mm. Nonetheless, for a fleet of small surveillance satellites, for which embodiment devices are particularly useful, an aperture in the range of about 100 mm to about 500 mm can be particularly desirable. Furthermore, embodiment remote imaging apparatuses may be used as part of remote sensing systems, and particularly as part of aircraft-based remote sensing systems. These aircraft-based remote imaging apparatuses and remote sensing systems can particularly benefit from the resolution provided by embodiments, and the resolution required for a given application will determine the aperture size desirable for the given application.

Figure 2A:
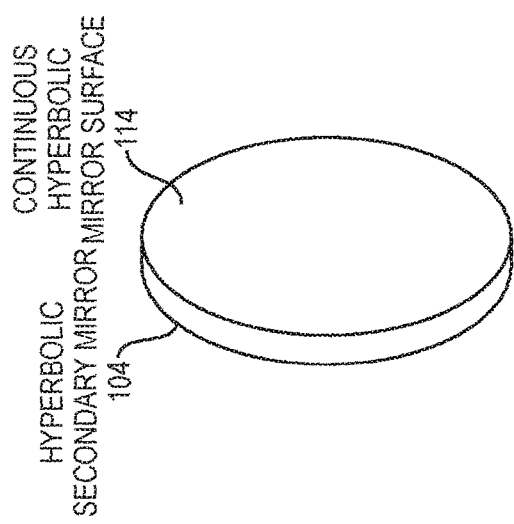
FIG. 2A is a perspective illustration of the hyperbolic secondary mirror in FIG. 1.
Figure 2B:
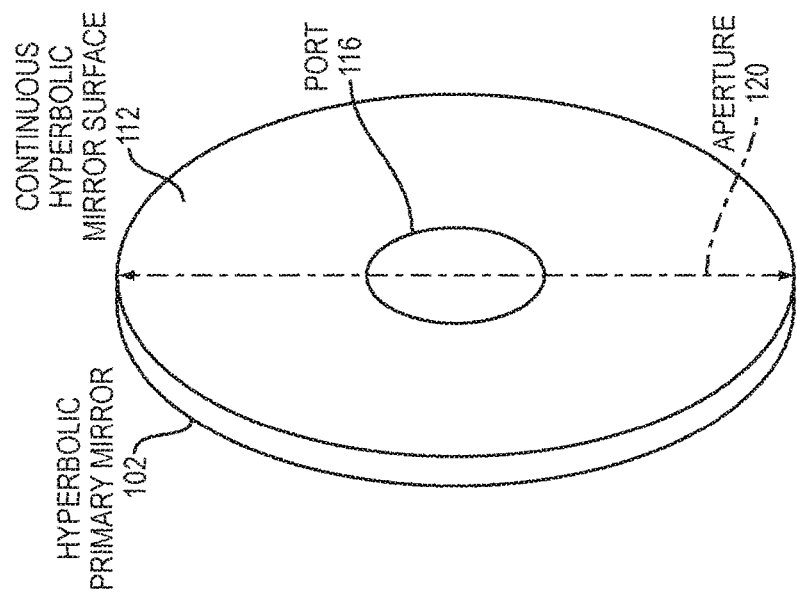
FIG. 2B is a perspective illustration of the hyperbolic primary mirror in FIG. 1.

FIG. 2A is a perspective illustration of the hyperbolic secondary mirror 104 described in connection with FIG. 1. FIG. 2A particularly shows how the secondary mirror 104 has the continuous hyperbolic primary mirror surface 114, such that both reflections from the secondary mirror occur on the same surface 114 characterized by the same hyperbolic curvature function. The secondary mirror 104 does not require a port and preferably has no holes there through.

FIG. 2B is a perspective illustration of the hyperbolic primary mirror 102 described in connection with FIG. 1. Notably, the hyperbolic primary mirror surface 112, which is continuous, also defines an inner opening, or port, 116 through which the light rays 122 can be passed to the external field corrector 106. As described in connection with FIG. 1, the mirror surface 112 is continuous in that it is characterized by a single hyperbolic function over which both reflections from the primary mirror surface, namely reflections R1 and R3, occur on the same uninterrupted surface.

Figure 3B:
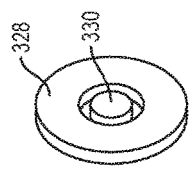
FIG. 3B (prior art) is a perspective-view illustration of the existing, nested secondary mirrors of FIG. 3A.
Figure 3D:
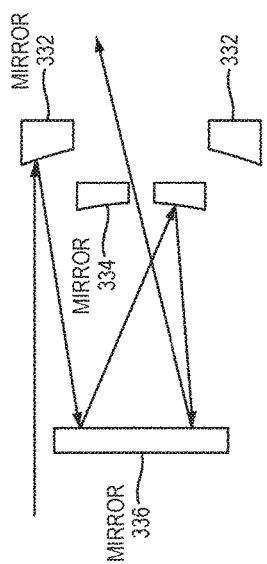
FIG. 3D (prior art) illustrates an existing telescope design that includes four reflections using compound primary mirrors and a planar secondary mirror.
Figure 3A:
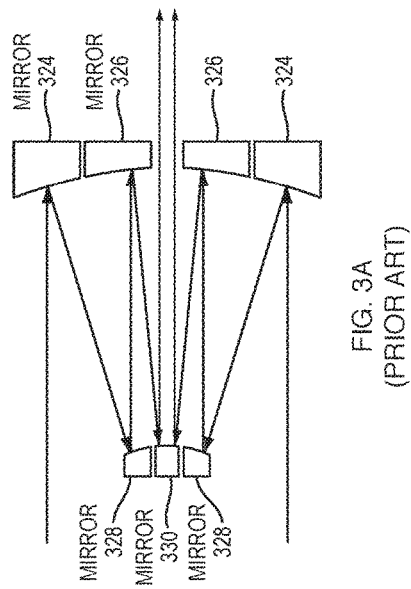
FIG. 3A (prior art) illustrates an existing telescope design that includes four reflections using two nested primary mirrors and two nested secondary mirrors.

FIGS. 3A-3D illustrate various aspects of existing telescopes for comparison and contrast with embodiment devices described elsewhere herein. In particular, FIG. 3A illustrates an existing telescope design that includes four reflections. However, each reflection occurs at a different mirror surface. The first reflection occurs at a mirror 324, the second reflection at a mirror 328, the third reflection at a mirror 326, and the fourth, final reflection at a mirror 330 before the light rays exit the telescope cavity. The mirrors 328 and 330 are annular with respect to each other, as illustrated in greater detail in the perspective illustration of mirrors 328 and 330 in FIG. 3B. Because of the gap between the mirrors 328 and 330, and because the two reflections at the "secondary" side of the telescope occur at distinct, separated surfaces characterized by different curvatures or functions, the mirrors 328 and 330 are not "continuous," as defined herein.

Figure 3C:
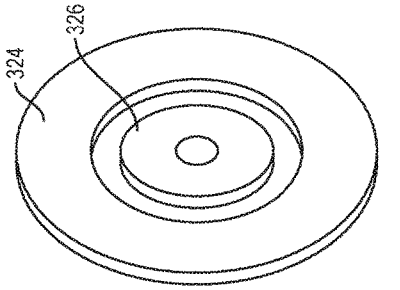
FIG. 3C (prior art) is a perspective-view illustration of the existing, nested primary mirrors of FIG. 3A.

Similarly, the mirrors 324 and 326 in FIG. 3A on the "primary" side of the telescope in FIG. 3A are annular with respect to each other, with a gap between the mirrors, as illustrated in greater detail in the perspective illustration in FIG. 3C. Accordingly, because of this gap, and because the two reflections at the "primary" side occur at two different mirror surfaces that are separated by a gap or discontinuity and are characterized by different curvatures or curvature functions, the mirrors 324 and 326 are not "continuous," as defined herein.

Variations of the device in FIG. 3A have also been proposed, in which the mirrors 324 and 326 on the "primary" side are modified to form a single mirror with the same curvature. However, this proposed, existing design has a major disadvantage in that distortion is not corrected. Furthermore, in other variations of the device of FIG. 3A, the mirrors 324 and 326, although they may be connected physically at a surface discontinuity, are still characterized by different curvature functions. This type of joined mirror is also not "continuous," as defined herein, because the two reflections occurring at the "primary" mirror in this case do not occur on the same surface, characterized by the same curvature function. Similarly, even if the mirrors 328 and 330 on the secondary side of the telescope in FIG. 3A are joined physically, but have separate curvature functions, they are not "continuous" as defined herein.

FIG. 3D is an illustration of yet another existing design with two reflections at the "primary" side and two reflections at the "secondary" side. The design of FIG. 3D also has significant limitations, in that separate "primary side" mirrors 332 and 334 must be fabricated, in addition to the "secondary" mirror 336. The configuration of FIG. 3D, like the device illustrated in FIG. 3A, includes significant complexities in manufacturing due to the additional mirror curvatures. Furthermore, the device of FIG. 3D, like that of FIG. 3A, cannot adequately compensate for optical errors for certain applications. The configuration of FIG. 3D is difficult to mount, baffle and align due to the additional interior mirror with the hole in the center. The small center hole also limits field of view.

An extension of the existing "Loveday" telescope to four reflections with two mirrors, which could be described as a straight double-pass Cassegrain telescope, has also been proposed, but immediately dismissed as having no practical interest due to the fact that the third and fourth reflections within such a telescope cannot contribute to aberration correction. This problem has also been pointed out for other telescope designs including multiple reflections from the same mirror. The existing designs fail to recognize the utility of a two-mirror, four-reflection telescope configuration in combination with an external field corrector, such as the embodiment illustrated in FIG. 1. Embodiment designs, therefore, are particularly useful in cases where it is highly desirable to have a very slow f/#, high telephoto effect, high degree of aberration correction, and relatively small aspect ratio, for example.

Figure 4:
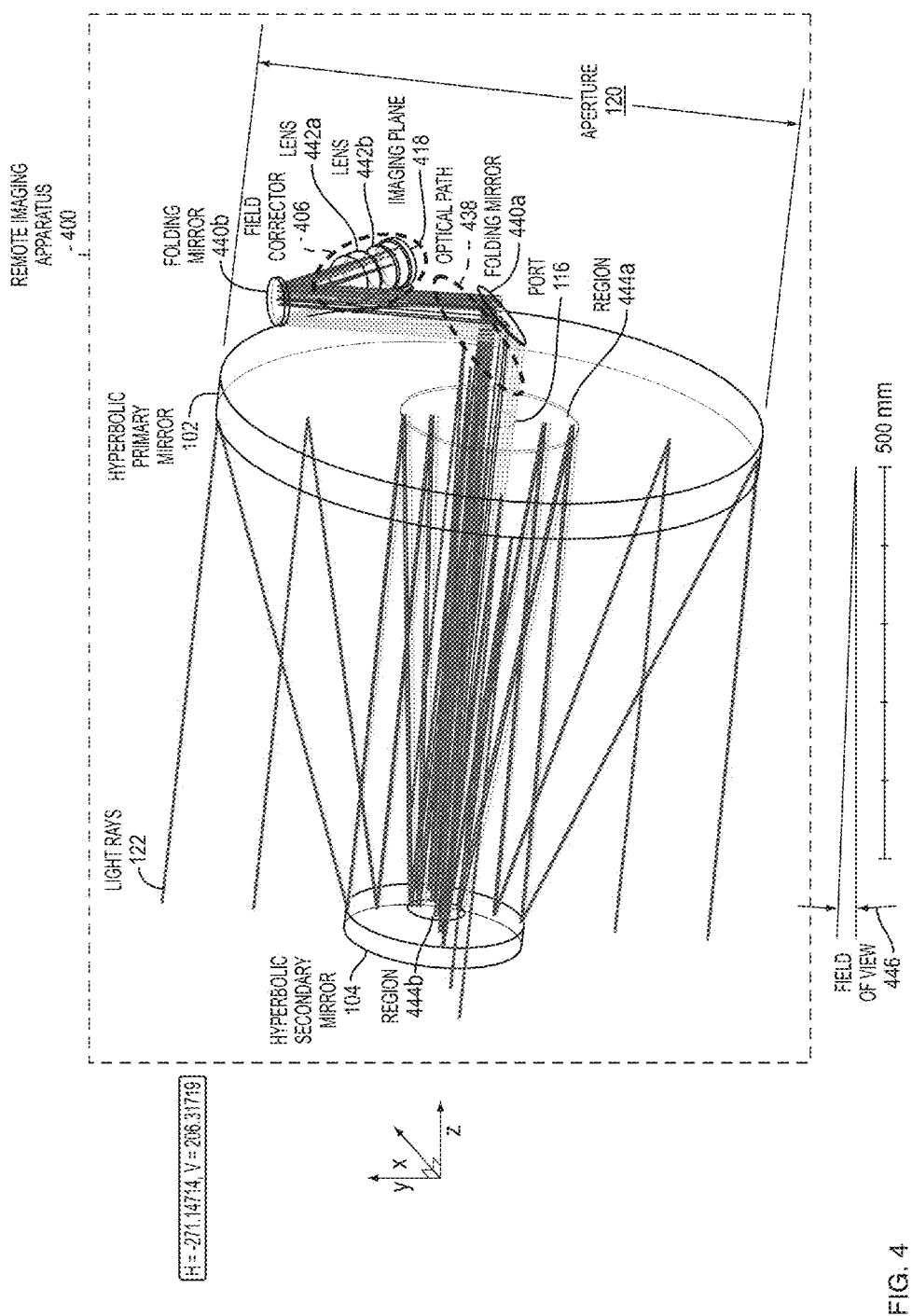
FIG. 4 is a solid-model illustration of an embodiment remote imaging apparatus with an aspect ratio of 0.96.

FIG. 4 is a solid-model illustration of a remote imaging apparatus 400 designed according to principles described in connection with FIGS. 1 and 2A-2B. The apparatus 400 also includes a compound folding mirror arrangement enabling an overall telescope aspect ratio that is particularly small, in addition to a small aspect ratio defined by the hyperbolic primary and secondary mirrors 102 and 104, respectively. Calculation of specific aspect ratios, as defined herein, is described in greater detail in connection with FIG. 8, for example. It should be understood that the compound folding mirror arrangement illustrated in FIG. 4 may be applied to any remote imaging apparatus, tracking system, or beam expander apparatus described herein.

In FIG. 4, similar to the description of FIG. 1, the light rays 122, which originate from a remote object to be imaged (not illustrated in FIG. 4), are received at the hyperbolic primary mirror 102 and reflected twice by each of the hyperbolic mirrors 102 and 104. Further in FIG. 4, as described in connection with FIG. 1, the first and third reflections occur at the primary mirror 102, and the second and fourth reflections occur at the hyperbolic secondary mirror 104.

Further illustrated in FIG. 4 is a region 444a of the hyperbolic primary mirror 102, shown as a darkened circle, over which the third reflection R2 occurs for various incident light rays. Also illustrated is a region 444b of the hyperbolic secondary mirror 104 reflective surface over which the fourth reflection R4 occurs. It should be understood that the regions 444a and 444b are only shaded for illustration and do not represent mechanically separate segments of the respective mirrors. As described in connection with FIGS. 1 and 2A-2B, the hyperbolic primary mirror 102 is continuous, with the reflective surface thereof defined by the same hyperbolic function over the area of the hyperbolic primary mirror 102 where reflection R1 occurs and the region 444a over which the reflection R3 occurs. Similarly, the hyperbolic secondary mirror 104 is continuous, with the reflective surface where reflections R2 and R4 occur being smooth and following the same hyperbolic function.

As stated briefly above, a particular advantage of the embodiment apparatus 400 is the use of a compound field corrector 406, which includes two fused silica lenses 442a and 442b, which flatten the optical field. An advantage of a field corrector such as the corrector 406 made exclusively from fused silica is the inherent radiation hardness of the fused silica material. This radiation hardness allows extended mission lifetime in space at altitudes at or near the Van Allen radiation belts. Furthermore, since fused silica is more readily available and inherently radiation hardened, it is advantageous to used fused silica where performance is adequate more specialized materials are not necessary to obtain the desired field flatness. However, for some designs that include a larger field of view that the apparatus 400, such as the embodiment described hereinafter in connection with FIGS. 14A-14B, 15, and 16A-16F, three-element field correctors composed of more specialized materials can be advantageous to achieve a desired field flatness over the larger field of view.

The lenses 442a-b also refract the light rays 122 to form an image of the remote object at an imaging plane 418. As will be understood by those familiar with the art of telescope design, a detector array (also referred to herein as a "pixel array") may be placed at the imaging plane 418 for image capture and recording, and this detector array may be any one of a wide variety of known types. The use of a compound folding mirror arrangement including a first folding mirror 440a and second folding mirror 440b provides extra distance in a plane parallel to the XY plane for field correction and imaging. In this way, the folding mirrors and field corrector, along with any detector array that may be used, will not add significantly to an overall length of the apparatus 400 beyond the basic length due to the separation between the mirrors 102 and 104.

Also illustrated in FIG. 4 is a field of view (FOV) 446, which is exaggerated for convenience of illustration. Various embodiments can have an FOV that varies widely according to the needs for a particular design. In many embodiments, the FOV can range between about 0.1° and about 0.5°. For example, in one embodiment described hereinafter in connection with FIG. 8, the calculated FOV of the apparatus is 0.2°. An embodiment described in connection with FIGS. 14A-14B has an FOV four times larger (in each dimension; 16 times larger target area imaged) than that of the embodiment of FIG. 4. Furthermore, as will be understood by those skilled in the art of telescope design, a combination of two mirrors will have an overall effective focal length (EFL) for the system. EFLs for particular embodiments may range from about 7 meters (m) to about 15 m, such as 10 m, for example. However, some embodiments have the EFLs less than 7 m or greater than 15 m.

The apparatus 400 has an aspect ratio of 0.96. This aspect ratio is defined by a separation of the reflective surfaces of the primary and secondary mirrors 102 and 104, divided by the aperture 120. This calculation is further described in connection with FIG. 8. In particular, the mirror separation for apparatus 400 is 673 mm, while the aperture 120 is 700 mm, yielding an aspect ratio of 0.96.

FIG. 5 is a table, in the form of a Zemax® spreadsheet defining a Zemax® design prescription for the embodiment apparatus 400 illustrated in FIG. 4. Zemax® OpticStudio™ version 16.5 was used for all Zemax® calculations described herein. The design prescription illustrated in FIG. 5 includes further specific parameters for the apparatus 400 to enable a person of ordinary skill in the art to make and use the apparatus 400, as well as to calculate additional pertinent optical parameters.

FIG. 6A is a graph illustrating field curvature calculated by Zemax® for the apparatus 400 illustrated in FIG. 4. In particular, field curvature (in millimeters) is shown on the horizontal axis as a function of field angle (in degrees) along the vertical axis. The different lines 648a-f show field curvature, over the full 0.120° angular half-FOV of the apparatus 400, for tangential and sagittal wavelengths indicated in the legend in microns. In particular, the curves 648*a-b* show tangential and sagittal field curvatures, respectively, for a wavelength of 0.950 µm. The curves 648*c-d* show tangential and sagittal field curvatures, respectively, for a wavelength of 0.400 µm. The curves 648*e-f* show tangential and sagittal field curvature, respectively, for a wavelength of 0.550 µm. These curves demonstrate extremely low values of field curvature and would be understood by a person of ordinary skill in the art of telescope optics to be high quality, demonstrating the uniqueness of embodiments in the combination of high performance, high resolution, and small aspect ratio.

FIG. 6B is a graph illustrating F-Tan (Theta) distortion (in percent) along the horizontal axis as a function of field angle (in degrees) along the vertical axis for the full 0.120° FOV of the apparatus 400. In particular, curves 650*a*, 650*b*, and 650*c* show F-Tan (Theta) distortion calculated for wavelengths of 0.950 µm, 0.400 µm, and 0.550 µm, respectively. F-Tan(Theta) distortion for imaging systems such as the apparatus 400 to ensure that imagery maps to a rectilinear grid. These are calculated values of F-Tan(Theta) distortion. Similar values may be measured for an apparatus that is built by placing the lens or remote imaging apparatus telescope on a rotary table about its principle plane and mapping the focus position location as a function of rotation angle. These curves demonstrate, as do those of FIG. 6A, extremely low values of field curvature and would be understood by a person of ordinary skill in the art of telescope optics to be of high quality, demonstrating the uniqueness of embodiments in the combination of high performance, high resolution, and small aspect ratio.

Figures 7A, 7B:
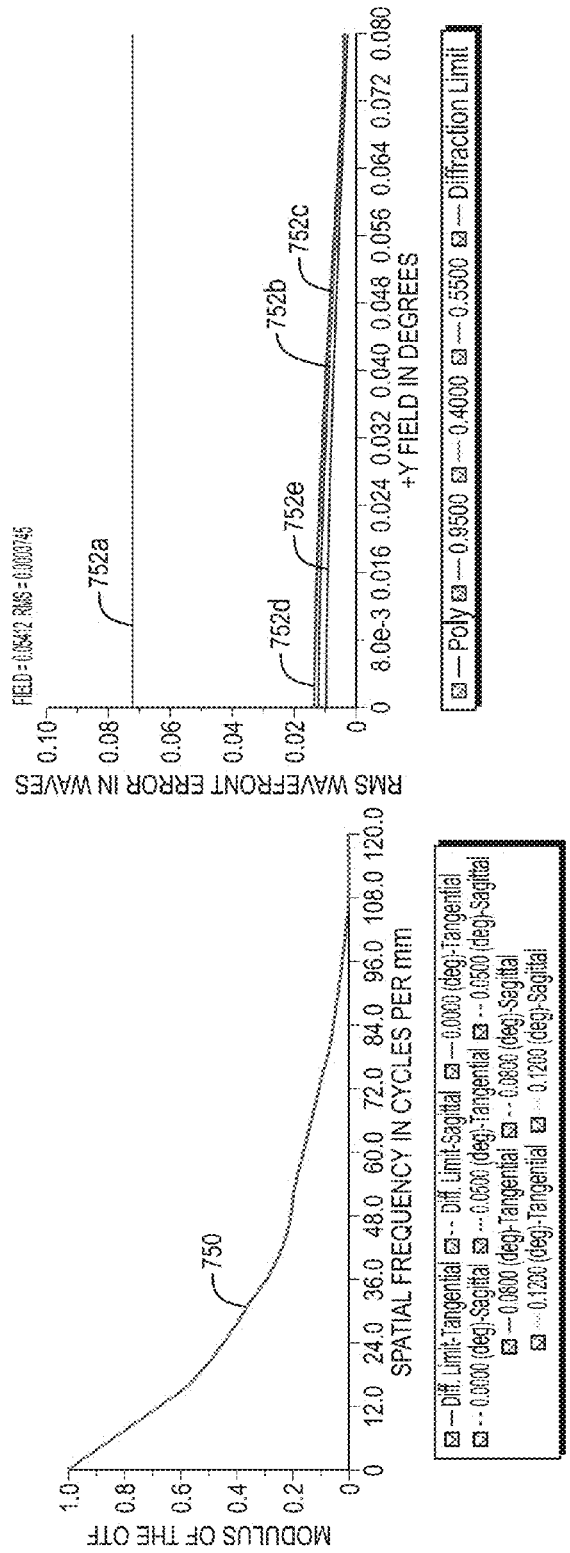
FIG. 7A is a graph showing modulus of the optical transfer function (OTF) as a function of spatial frequency for the embodiment remote imaging apparatus of FIG. 4.
FIG. 7B is a graph showing calculated root mean square (RMS) wavefront error as a function of field angle for the embodiment remote imaging apparatus of FIG. 4.

FIG. 7A is a graph showing modulus of the optical transfer function (OTF) (along the vertical axis) as a function of spatial frequency (cycles per millimeter) along the horizontal axis for the apparatus 400 of FIG. 4. The modulus OTF is shown for various tangential and sagittal field positions of 0.0000 degrees, 0.0500 degrees, 0.0800 degrees, and 0.1200 degrees. These plots 750, designated with the same reference number because they fall so close together, show that the off-axis performance and on-axis performance are indistinguishable and the optical performance of the embodiment of FIG. 4 is limited by fundamental diffraction-limited resolution, rather than any defect in the design.

FIG. 7B is a graph showing calculated root mean square (RMS) wavefront error (in waves, along the vertical axis) as a function of field angle (in degrees, along the horizontal axis) for the apparatus 400. Curves 752*a-e* show that the off-axis performance and on-axis performance are practically indistinguishable and the optical performance of the design is limited by fundamental diffraction limited resolution, rather than any defect in the design at all wavelengths and field angles. The curve below which diffraction becomes the limit is 752*a*. The remaining curves demonstrate that the performance of the apparatus 400 is better than the diffraction limit by a factor of around 6, meaning that there is some performance margin in the design as well.

Figure 8:
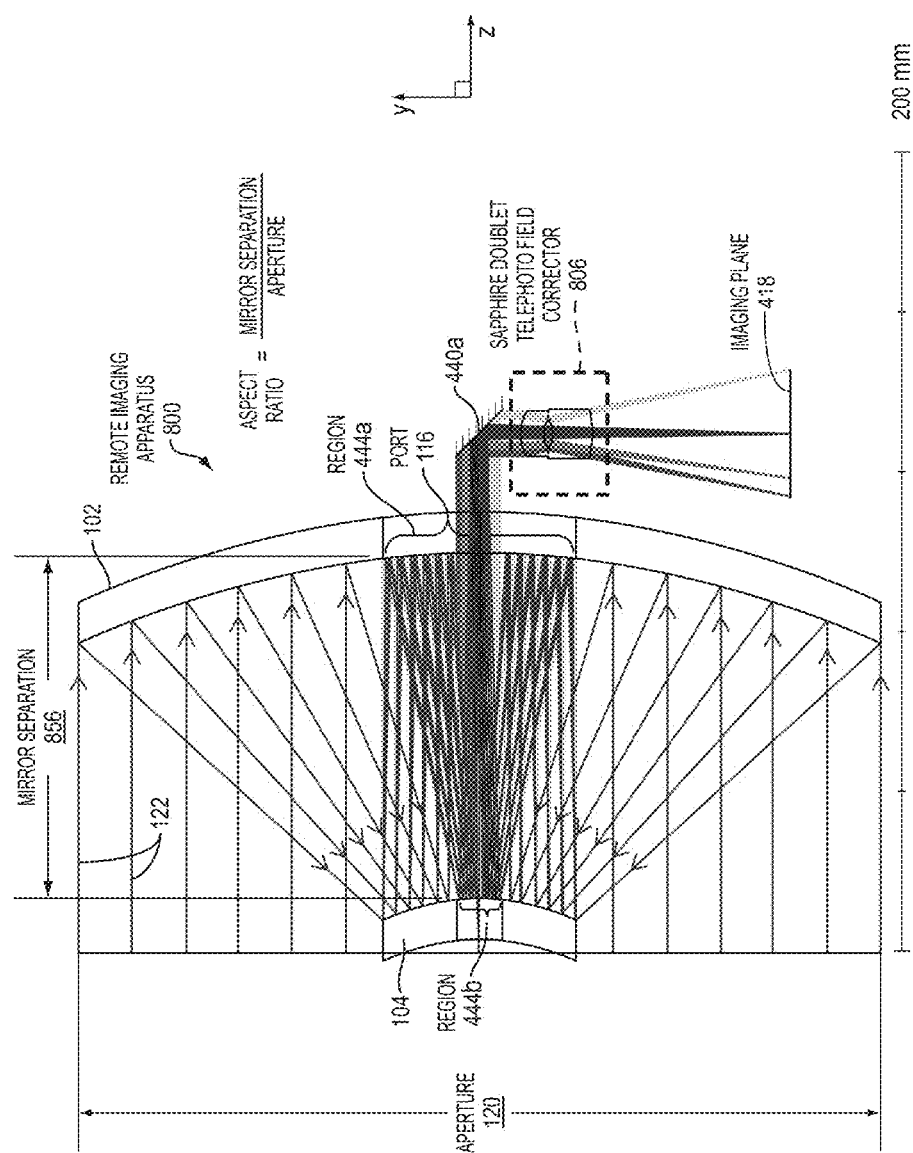
FIG. 8 is a cross-sectional diagram illustrating an embodiment remote imaging apparatus incorporating two hyperbolic mirrors and a sapphire doublet telephoto field corrector.

FIG. 8 is a cross-sectional diagram illustrating a remote imaging apparatus 800 incorporating a sapphire doublet telephoto field corrector 806. An advantage of the telephoto field corrector 806 is that further magnification of the resultant image of the remote object can be provided at the imaging plane 418, potentially increasing resolution of the imaged remote object. In the embodiment apparatus 800, the separation between the sapphire doublet lenses in the field corrector 806 is fixed, resulting in fixed magnification of the image. However, in other embodiments, a spacing between the two lenses of the sapphire doublet lenses, or other lenses of a telephoto field corrector, is variable, resulting in the capacity of the apparatus to zoom in or out in order to view variable regions of an target object to be imaged. For example, in the case of a remote imaging apparatus being used in a space-based satellite, a variable telephoto field corrector can be adjusted in order to view a variable portion of the surface of the earth. Similarly, variable zoom may be particularly useful in a reconnaissance-aircraft-based remote imaging apparatus.

FIG. 8 also illustrates how aspect ratio is calculated for particular embodiments described herein. In particular, "aspect ratio," as used herein in reference to particular calculated values and as defined in the claims, is calculated as the ratio of the mirror separation to the aperture. As an example, FIG. 8 illustrates the aperture 120, also referred to herein as "input aperture," for the apparatus 800. In apparatus 800, the aperture 120 is 200 mm. The aperture 120 is the diameter of the primary mirror 102 and can be described as the diameter over which the apparatus can receive and reflect light from the remote object to be imaged to the secondary mirror 104. A mirror separation 856 for the apparatus 800 is also shown, which is the separation of the inner reflective surfaces of the mirrors 102 and 104 along the common central optical axis Z of the mirrors. In many embodiments, this aspect ratio is in a range of about 0.3 to about 3.0. In certain embodiments, the aspect ratio is in a range of about 0.3 to about 2.0. Furthermore, in other certain embodiments, the aspect ratio is in a range of about 0.3 to about 1.2. Examples include the apparatus 400 illustrated in FIG. 4, which has an aspect ratio of 0.96, and an apparatus 900 described hereinafter in connection with FIG. 9, which has an aspect ratio of 0.43. In certain designs within the scope of described embodiments, the aspect ratio is in a range of about 0.8 to about 1.2, such that a telescope including the embodiment imaging apparatus may have an approximate cube form factor and aspect ratio in a range of about 1.0.

It should be understood that a telescope or other imaging system incorporating an embodiment remote imaging apparatus may include an external field corrector, detector pixel array, and other objects and instruments, as well as a housing. This telescope or other system incorporating a remote imaging apparatus may have an aspect ratio that differs from the aspect ratio defined by the mirror separation divided by the aperture, as illustrated in FIG. 8. However, where specific values are given for calculated aspect ratios herein, they are calculated using the equation illustrated in FIG. 8 and described above, based on the mirrors themselves.

Furthermore, it should be understood that, due to the size of typical telescope mirrors, it is often the aspect ratio defined above, based on the mirror parameters themselves, which dominates the overall design. Thus, even with a telescope housing and other components of the telescope, the aspect ratio defined by the mirror separation divided by the aperture, as defined above, which can be particularly small in embodiment designs, even while maintaining high optical fidelity, provides particular advantages. As illustrated in FIGS. 4 and 8, for example, the ability to fold the field correction and imaging path can significantly limit any increase in aspect ratio beyond the aspect that defined by the mirrors themselves, if desired.

It should also be understood that, where primary and secondary mirrors are not hyperbolic, such as in a beam expander apparatus 1100 described in connection with FIG. 11, which has parabolic mirrors, aspect ratios are calculated in the same way for particular aspect ratio values described herein. In particular, aspect ratio is still defined, as used herein, by the separation of the reflective surfaces of the primary and secondary mirrors, along the common optical Z axis of the mirrors and imaging apparatus 100 as illustrated in FIG. 1, divided by the diameter (aperture) of the primary mirror.

The imaging apparatus 800 of FIG. 8 has a 0.2 degree FOV, an EFL of 10.16 m, and a distortion of 0.2% over a wavelength range of 400 nm-2100 nm. The apparatus 800 is F/50.6, and all optical materials are radiation-hardened.

Figure 9:
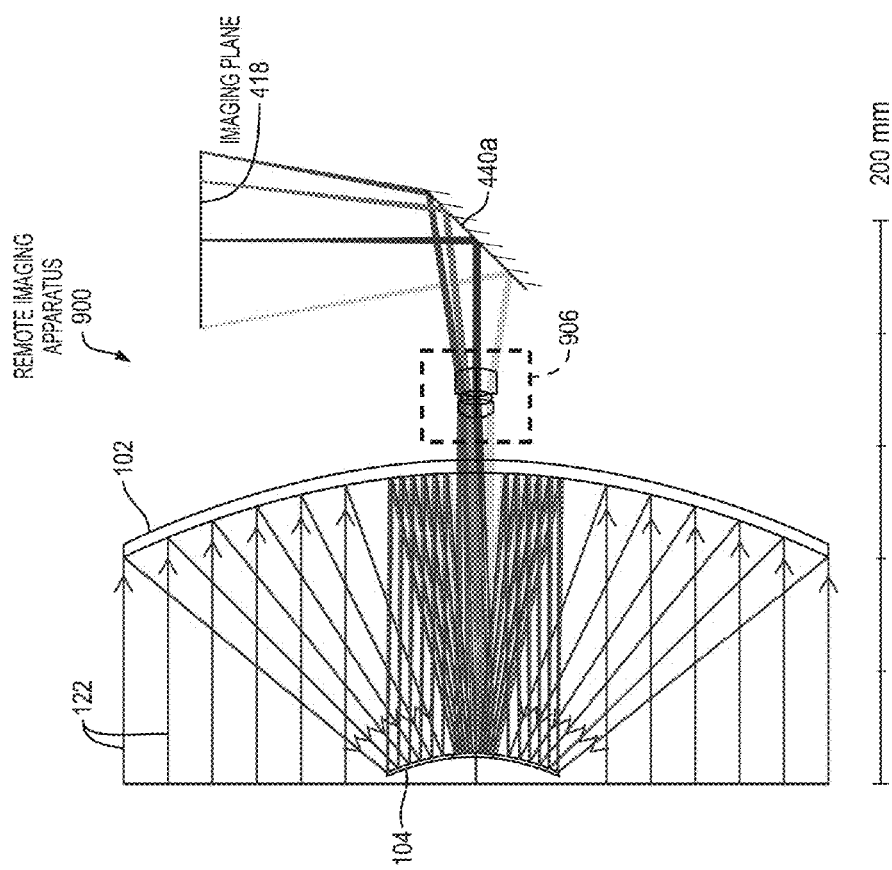
FIG. 9 is a cross-sectional-view illustration of an embodiment remote imaging apparatus with a particularly small aspect ratio of 0.43.

FIG. 9 is a cross-sectional view illustration of a remote imaging apparatus 900 with a three-element field corrector 906 and particularly small aspect ratio of 0.43. The apparatus 900 of FIG. 9 has an even wider field (larger focal plane) than the apparatus 800 of FIG. 8.

FIG. 10 is a table showing a Zemax® design prescription for the apparatus 900 illustrated in FIG. 9. The design prescription in FIG. 10 is similar to that illustrated in FIG. 5 and will further enable a person of ordinary skill in the art to make and use the remote imaging apparatus 900.

Figure 11:
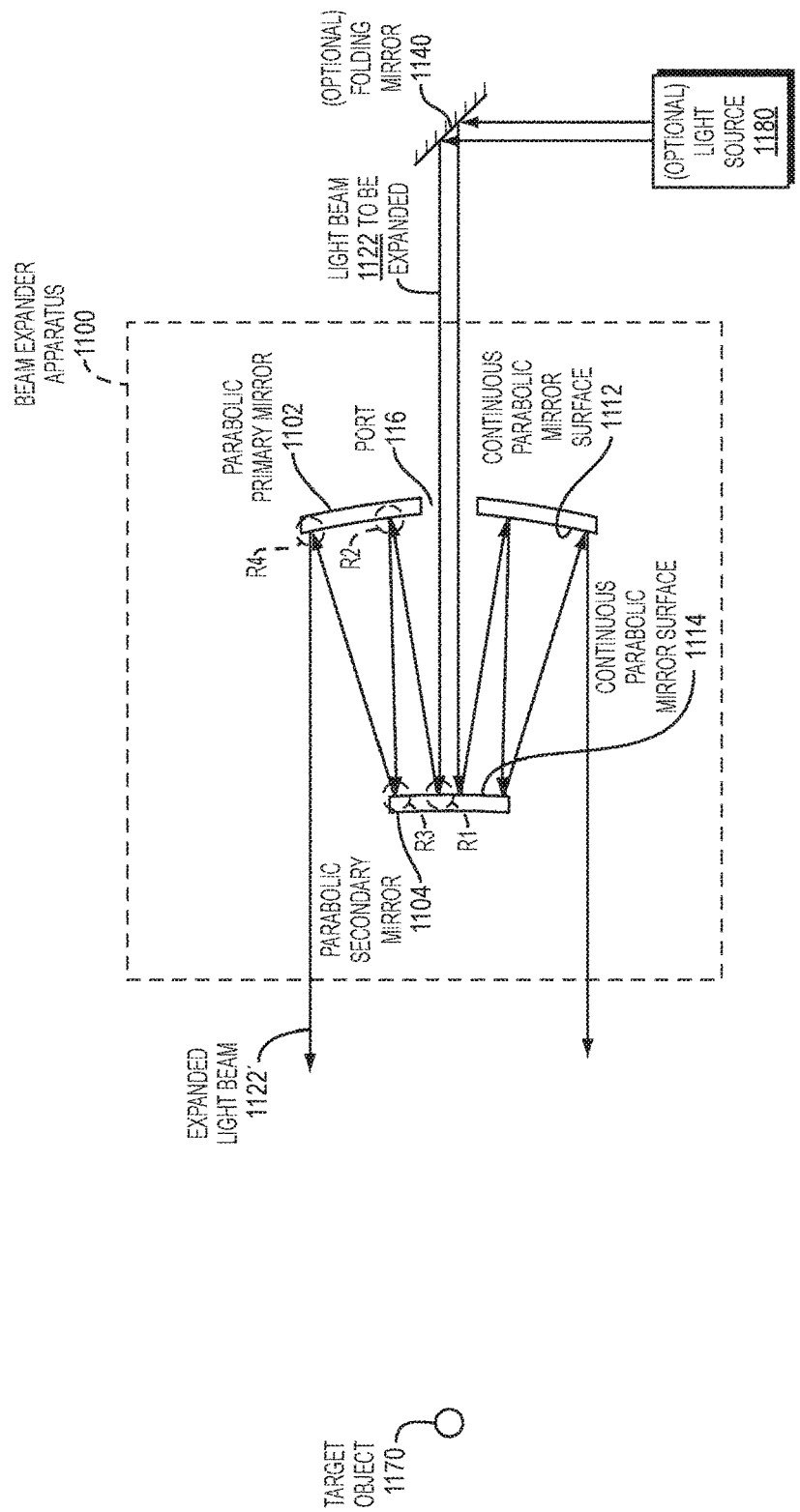
FIG. 11 is a cross-sectional-view illustration of an embodiment beam expander apparatus having two parabolic mirrors, each configured to reflect, at least twice, a light beam to be expanded.

FIG. 11 is a cross-sectional illustration of a beam expander apparatus 1100. The beam expander 1100 is somewhat similar to the remote imaging apparatus 100 illustrated in FIG. 1 operated in reverse, with some notable differences described hereinafter. The beam expander apparatus 1100 includes a parabolic primary mirror 1102 and a parabolic secondary mirror at 1104 arranged with respect to each other to permit an incoming light beam 1122 to be expanded to output an expanded light beam 1122'. Each of the mirrors 1102 and 1104 is "parabolic" because it has a reflective surface 1112 and 1114, respectively, which has a respective curvature defined by a parabolic function, as is understood in the art of mathematics, and more particularly in the art of reflector telescope optics. Each of the mirror surfaces 1112 and 1114 is continuous, similar to the continuous surfaces described hereinabove in connection with FIG. 1 and FIGS. 2A-2B, except that each of the continuous mirror surfaces 1112 and 1114 is characterized by the respective parabolic curvature function. Each mirror surface 1112 and 1114 is configured to reflect, at least twice, the light beam 1122.

The parabolic secondary mirror 1104 receives the light beam 1122 through the port 116 in the parabolic primary mirror 1102. The secondary mirror 1104 reflects the beam 1122 (first reflection, R1) toward the primary mirror 1102. The primary mirror 1102 reflects the beam (second reflection, R2) back to the secondary mirror 1104. The secondary mirror 1104 reflects, a second time, the beam (third reflection, R3) back to the parabolic primary mirror 1102. The primary mirror 1102 is configured to deliver the expanded light beam 1122' to a target object 1170. The target object 1170 may be remote or close by, at any distance from the apparatus 1100.

The light beam 1122 may be provided by an optional collimated light source 1180 or other light source. The light source 1180 may be directed through the port 116 in the primary mirror 1102 directly. However, in many embodiments, and as illustrated in FIG. 11, it is convenient to provide an optional folding mirror 1140 so that the light source need not be oriented on axis with the apparatus 1100.

The target object 1170 may be solid, or it may be air, such that the apparatus 1100 is configured to direct the expanded light beam 1122' into the air. In addition to the reflections illustrated in FIG. 11, some embodiments include each of the primary and secondary parabolic mirrors being configured to reflect the light beam 1122 at least three times. Whether two times, three times, or a greater number of reflections from each of the mirrors, embodiment beam expanders enable well corrected beam expansion with a small form factor and aspect ratio. Aspect ratios for embodiment beam expanders can include the same values described hereinabove in connection with FIG. 8 for remote imaging apparatuses, for example. These example small aspect ratios can be particularly helpful to decrease a moment of inertia of the apparatus 1100. Thus, the beam expander apparatus 1100 may form part of a beam director, as described in connection with FIG. 12, to enable the expanded light beam 1122 to be pointed and directed with greater rapidity, smaller actuators, or both.

Figure 12:
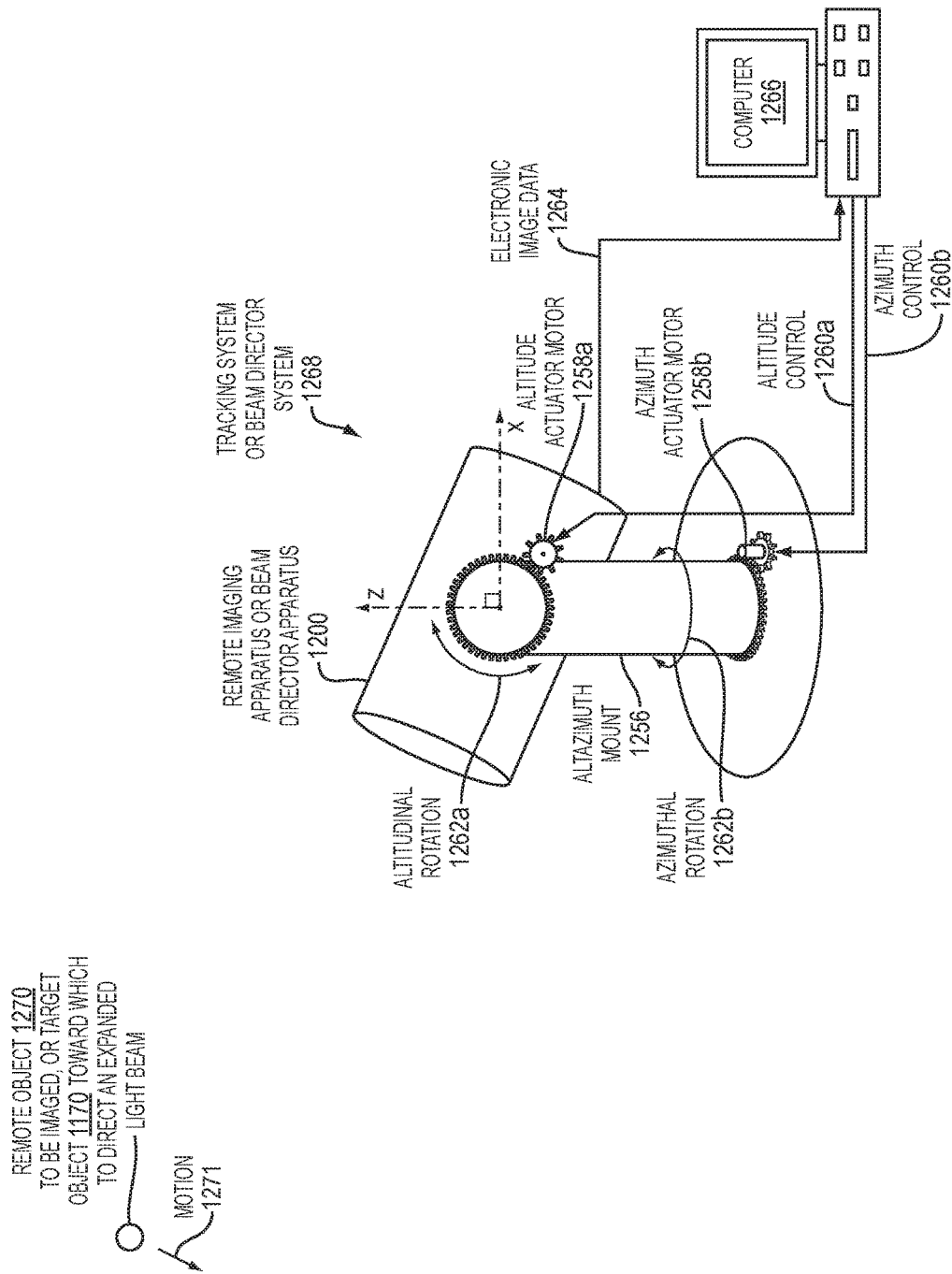
FIG. 12 is a perspective-view illustration of an embodiment tracking system or beam director system that incorporates an embodiment remote imaging apparatus or beam director apparatus, respectively, and is configured to continuously image or direct a beam towards a remote object, respectively, even with relative motion between the remote object and the tracking or beam director system, respectively.

FIG. 12 is a perspective view illustration of a tracking system 1268 that incorporates a remote imaging apparatus 1200 and is configured to image continuously a remote object 1270, where there is relative motion 1271 between the remote object 1270 and the tracking system 1268. Thus, the tracking system 1268 may be considered stationary, such as an Earth-mounted tracking system, with the remote object 1270, such as a projectile or aircraft, for example, moving. However, in other embodiments, the remote object 1270 may be considered as stationary, with the tracking system 1268 in motion relative to the remote object. Such is the case, for example, where the tracking system 1268 is part of the satellite configured to image Earth. It should also be understood that relative motion between the tracking system 1268 and remote object 1270 can also be provided where both system and object are in motion with respect to a reference frame. The remote imaging apparatus 1200 can include any of the embodiments illustrated and described in connection with FIGS. 1, 4, 8, and 9 herein, for example.

The tracking system 1268 includes actuators configured to slew the system 1268 angularly for repeated imaging of the remote object, even with the relative motion between the object and system. The system 1268 particularly includes an altazimuth mount 1256 that permits altitudinal rotation 1262a and azimuthal rotation 1262b. The altitudinal rotation 1262a (about the tracking system Y axis, which is perpendicular to the X and Z axes illustrated in FIG. 12) is provided by an altitude actuator motor 1258a that is controlled by a computer 1266 through an altitude control signal 1260a. Similarly, an azimuthal actuator motor 1258b provides the azimuthal rotation 1262b (about the tracking system Z axis illustrated in FIG. 12) and is controlled by the computer 1266 via an azimuth control signal 1260b.

The computer 1266 in FIG. 12 receives electronic image data 1264 from the imaging apparatus 1200, which can be provided by any detector (pixel) array incorporated into the apparatus 1200, such as the array 118 illustrated in FIG. 1. The computer 1266 evaluates the image data 1264 to determine whether the image of the remote object 1270 is centered in the FOV of the imaging apparatus 1200. As necessary, the computer 1266 adjusts the actuator motors 1258a-b in order to image the remote object 1270 repeatedly and continuously.

It should be understood that other embodiment tracking systems can include any type of actuation or actuators known to those skilled in the art. Furthermore, apparatus and methods for control of the motion of the tracking system 1268 can vary and can include any methods and apparatus known to those skilled in the art. For example, it will be understood that embodiment tracking systems provided in satellites, land-based systems, mobile units, and aircraft will include different design considerations within the knowledge of those skilled in the respective arts. Advantageously, the small aspect ratios provided by embodiments described herein can facilitate providing smaller moments of inertia for tracking systems. The smaller moments of inertia can enable actuators to be smaller or to consume less power. Smaller moments of inertia can also enable embodiment tracking systems to converge on the remote object more quickly. Furthermore, the smaller aspect ratios enabled by the double-pass, quadruple-reflection configurations described herein enable compact form factors, such that a satellite launch vehicle may accommodate a high-resolution, high-optical-fidelity tracking system, or multiple such tracking systems, more easily.

The tracking system 1268 described in connection with FIG. 12 may be modified to constitute a beam director system as described in following. The remote imaging apparatus 1200 may be replaced by any embodiment beam expander apparatus, such as the apparatus 1100 described in connection with FIG. 11, including a light source. The remote object 1270 to be imaged, as illustrated in FIG. 12, may be replaced by the target object 1170 to which expanded light beam 1122', as illustrated in FIG. 11, is directed. The actuator motors 1258a-b, or other actuators are known to those skilled in the art, may be used to rotate the beam expander apparatus angularly for repeated directing of the light beam toward the target object repeatedly, even with relative motion between the target object and beam director system.

Guidance of the beam director system for control of the actuators may be provided by any means known in the art. For example, the beam director apparatus 1200 may be further configured to have imaging capability as described in connection with the remote imaging apparatus embodiments described herein. In this way, the beam director system 1268 also serves as a tracking system, and the electronic image data 1264 can be provided by a pixel array, as described hereinabove in connection with the remote imaging apparatus. In other embodiments, imaging of a remote target object can be performed separately from the beam directing. A beam director system, like the tracking system described hereinabove, may be mounted in a satellite or other spacecraft, mounted in an aircraft, mounted on a ground-based vehicle, or positioned in a stationary ground-based system, for example.

Figure 13:
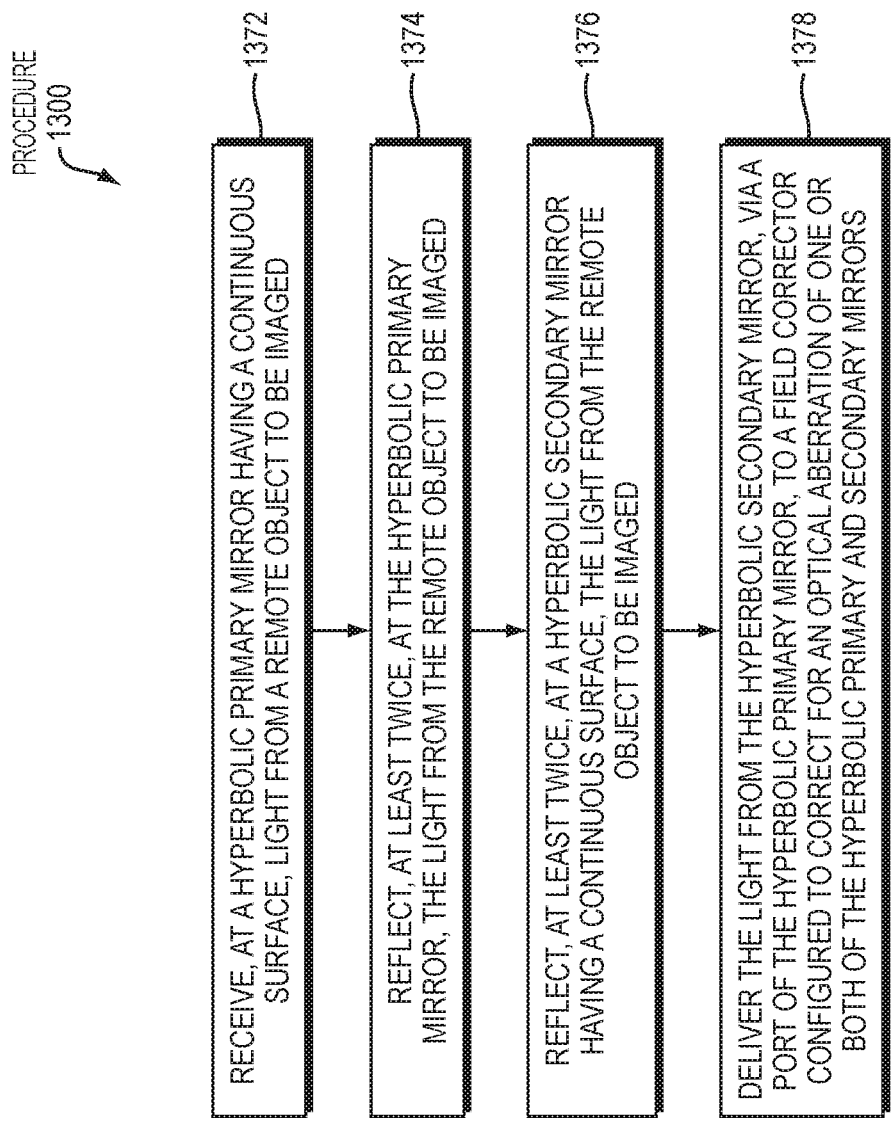
FIG. 13 is a flow diagram illustrating an embodiment procedure for remote imaging.

FIG. 13 is a flow diagram illustrating a procedure 1300 for remote imaging. The procedure 1300 may be performed using any embodiment remote imaging apparatus described herein, such as those described in connection with FIG. 1, 4, 8, 9, or 12, for example.

At 1372, light from a remote object to be imaged is received at a hyperbolic primary mirror having a continuous surface. At 1374, the light from the remote object to be imaged is reflected, at least twice, at the hyperbolic primary mirror.

At 1376, the light from the remote object to be imaged is reflected, at least twice, at a hyperbolic secondary mirror having a continuous surface. At 1378, the light is delivered, from the hyperbolic secondary mirror, via a port of the hyperbolic primary mirror, to a field corrector configured to correct for an optical aberration of one or both of the hyperbolic primary and secondary mirrors.

In other embodiments, the method can also include actually performing the correction for an optical aberration of one or both of the hyperbolic primary and secondary mirrors by using the field corrector.

Figure 14A:
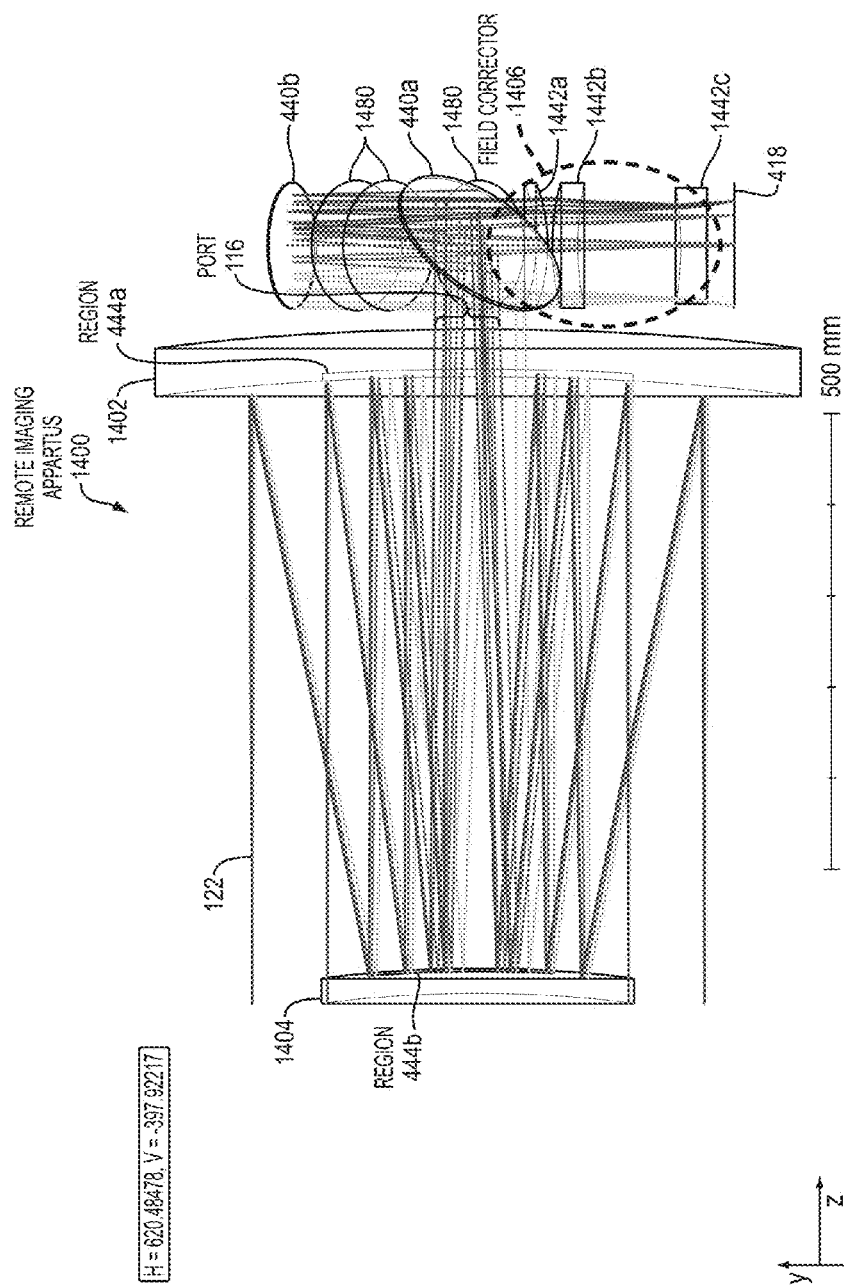
FIG. 14A is a side-view illustration of an embodiment remote imaging apparatus with an aspect ratio of 0.93 and a field of view four times larger (16 times larger imaging area) than the embodiment of FIG. 4.

FIG. 14A is a side-view illustration of a remote imaging apparatus 1400 designed according to the principles described in connection with FIGS. 1 and 2A-2B. Furthermore, the apparatus 1400 has many characteristics that are similar to the embodiment apparatus 400 illustrated in FIG. 4, with certain differences that are pointed out hereinafter. In particular, the apparatus 1400 includes an aperture diameter of 700 mm and a mirror separation of 652 mm (see FIG. 8 for detailed definitions of these parameters) for an aspect ratio of 0.93. The FOV of the apparatus 1400 in each of the X and Y dimensions is four times larger than that of FIG. 4, for a total imaged area that is 16 times larger than that of FIG. 4. Furthermore, as will be illustrated hereinafter, the larger-FOV apparatus 1400 can still maintain high optical quality, including very low distortion, even with aspect ratio below unity and the lower cost two-mirror, four-reflection design with external field corrector.

The apparatus 1400 includes a hyperbolic primary mirror 1402, a hyperbolic secondary mirror 1404, folding mirrors 440a-b, and a field corrector 1406 that have characteristics and perform functions similar to those described for corresponding elements of other embodiments. However, in contrast to the two-element fused silica field corrector 406 of FIG. 4, the field corrector 1406 in the apparatus 1400 is a three-element corrector including three lenses 1442a-c comprised of proprietary Schott® glass mixtures with higher indices of refraction, lower dispersion, and better correction of chromatic aberration. This higher performance, three-element field corrector 1406 enables imaging quality of the apparatus 1400 to be maintained even with the dramatically larger FOV. In particular, the first lens 1442a is comprised of Schott® glass LAK9-G15, while the second and third lenses 1442b-c are comprised of Schott® glass mixture F2-G12. All three lenses 1442a-c are cerium-doped for radiation hardness. The illustration in FIG. 14A further includes various dummy surfaces 1480 that are defined only for modeling purposes and do not represent physical surfaces of the apparatus.

Figure 14B:
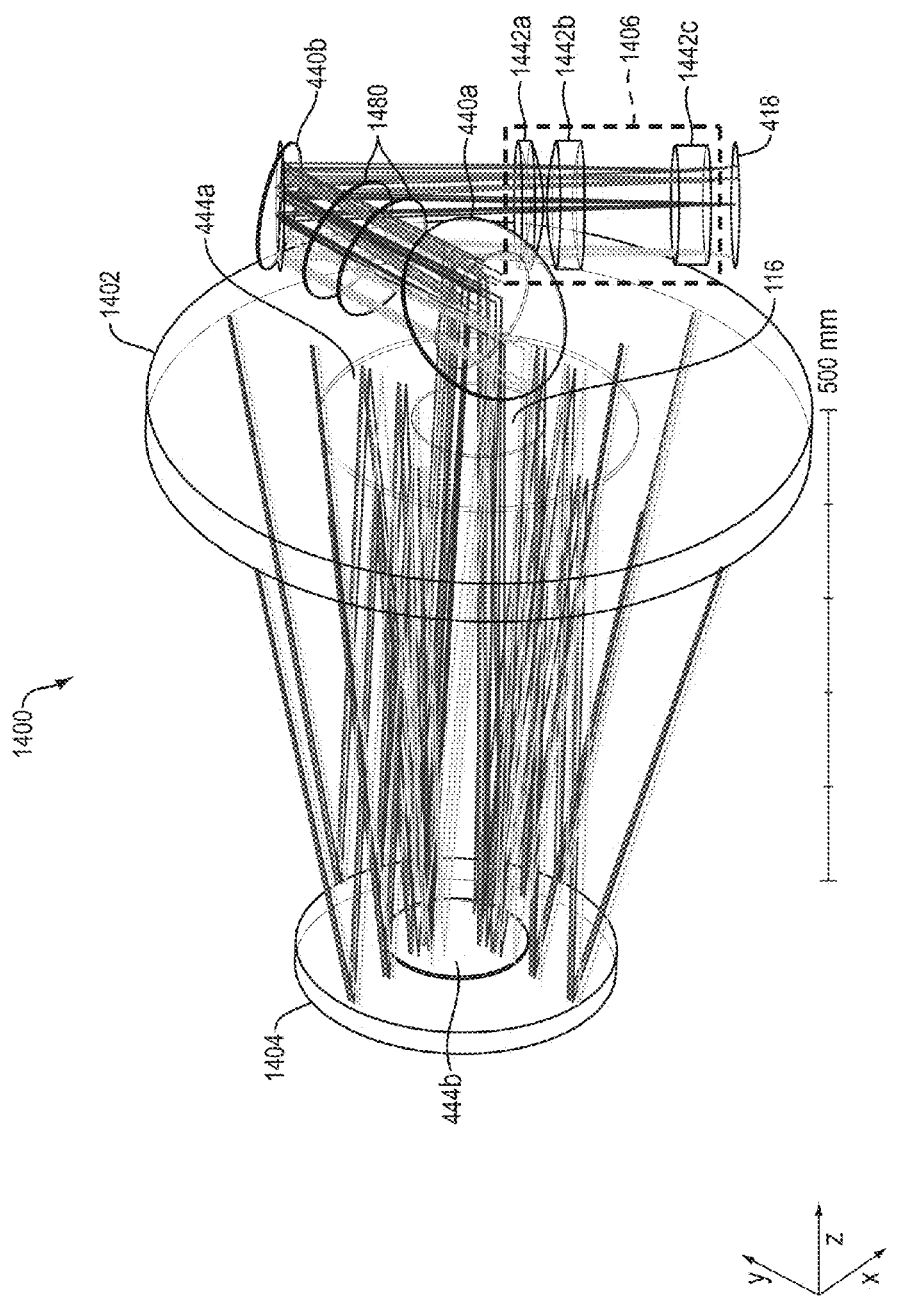
FIG. 14B is a perspective-view solid-model illustration of the embodiment apparatus of FIG. 14A.

FIG. 14B is a perspective-view illustration of the embodiment apparatus 1400 illustrated in FIG. 14A.

Figure 15:
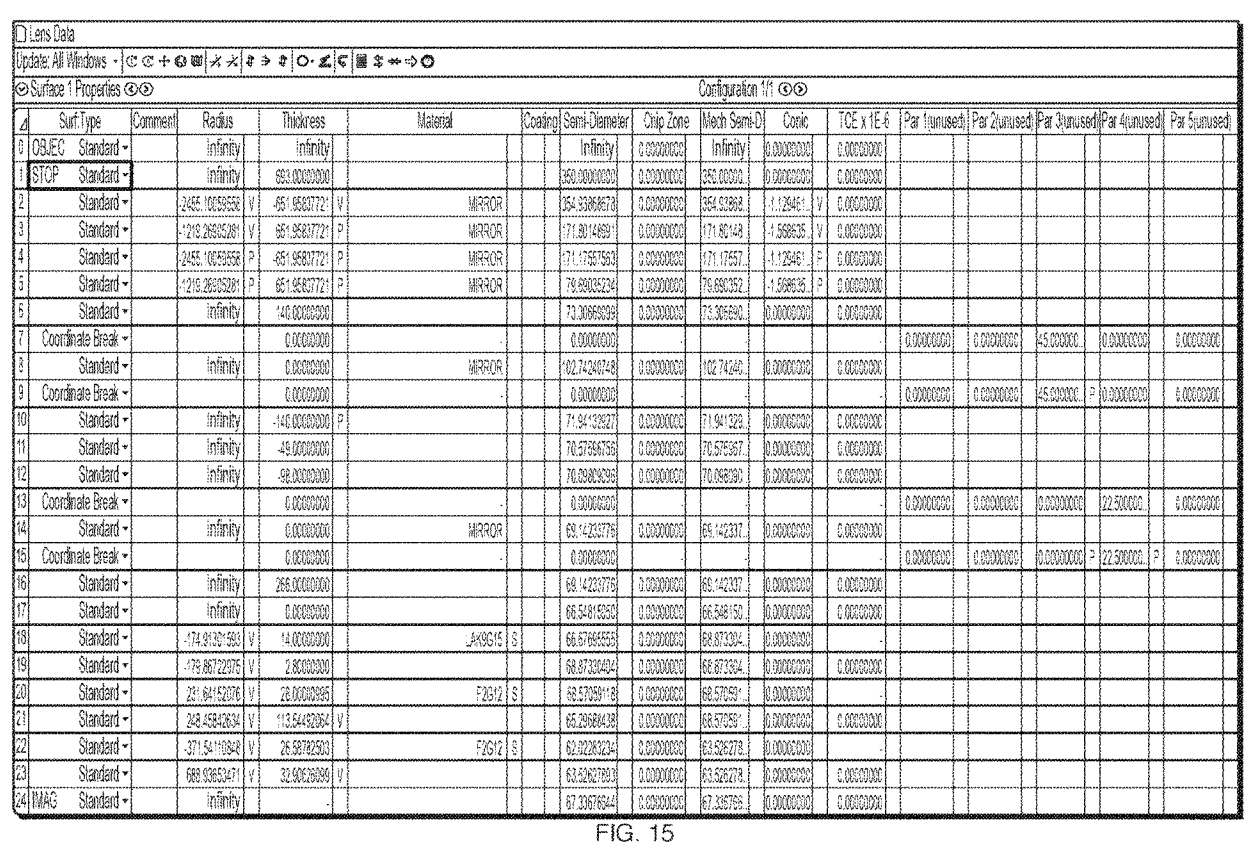

FIG. 15 is a table, in the form of a Zemax® spreadsheet defining a Zemax® design prescription for the embodiment apparatus 1400 illustrated in FIGS. 14A-14B. The design prescription illustrated in FIG. 15 includes further specific parameters for the apparatus 1400 to enable a person of ordinary skill in the art of telescope optical design to make and use the apparatus 1400, as well as to calculate additional pertinent optical parameters.

Figure 16B:
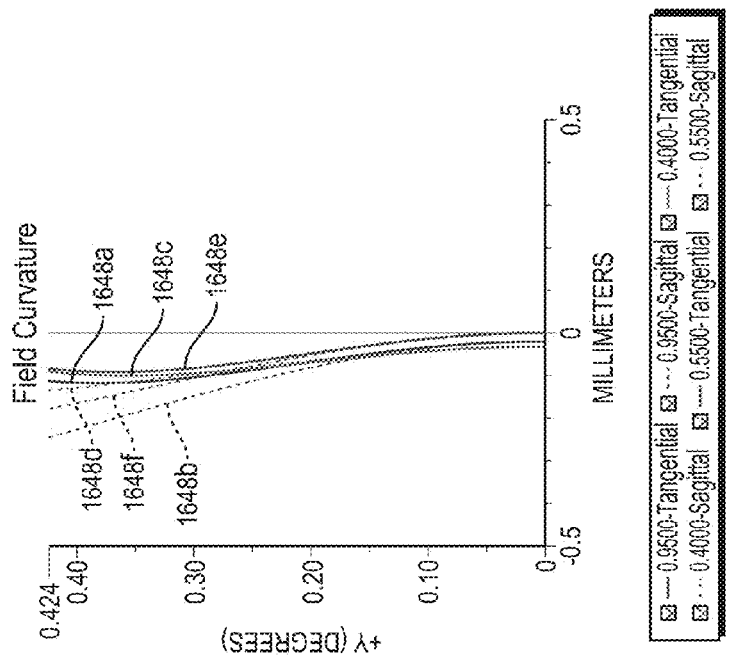
FIG. 16B is a graph illustrating F-Tan (Theta) distortion as a function of field angle for the field of view of the embodiment remote imaging apparatus of FIGS. 14A-14B.
Figure 16A:
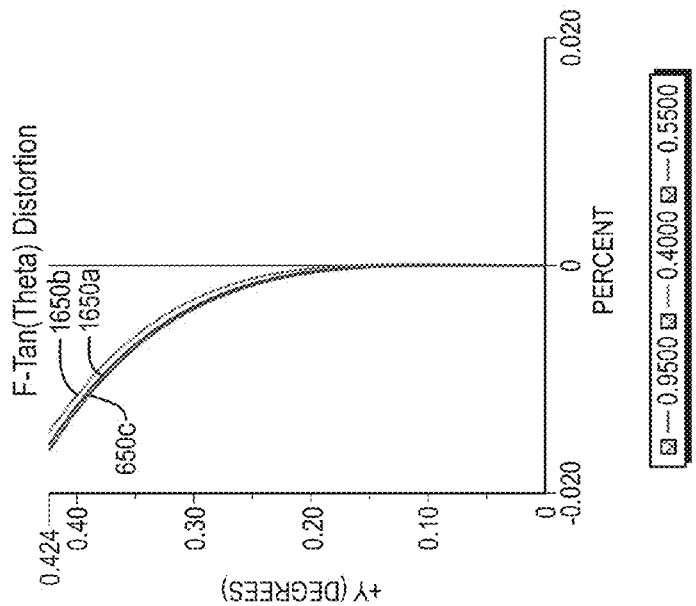
FIG. 16A is a graph illustrating field curvature calculated by Zemax® for the embodiment remote imaging apparatus illustrated in FIGS. 14A-14B.

FIG. 16A is a graph illustrating field curvature calculated by Zemax® for the apparatus 1400 illustrated in FIGS. 14A-14B. In particular, field curvature (in millimeters) is shown on the horizontal axis as a function of field angle (in degrees) along the vertical axis. The different lines 1648a-f show field curvature, over the full 0.424° angular half-FOV of the apparatus 1400, for tangential and sagittal wavelengths indicated in the legend in microns. In particular, the curves 1648a-b show tangential and sagittal field curvatures, respectively, for a wavelength of 0.950 µm. The curves 1648c-d show tangential and sagittal field curvatures, respectively, for a wavelength of 0.400 µm. The curves 1648e-f show tangential and sagittal field curvatures, respectively, for a wavelength of 0.550 µm. These curves demonstrate extremely low values of field curvature and would be understood by a person of ordinary skill in the art of telescope optics to be of high quality, demonstrating the uniqueness of various embodiments in the combination of high performance, high resolution, small aspect ratio, and even large FOV. Very low distortion is evident in the field curvature over even the four times greater FOV of the apparatus 1400 than of the apparatus 400 illustrated in FIG. 4.

FIG. 16B is a graph illustrating F-Tan (Theta) distortion (in percent) along the horizontal axis as a function of field angle (in degrees) along the vertical axis for the full 0.424° FOV of the apparatus 1400. In particular, curves 1650a-c show calculated distortion for wavelengths of 0.950 μm, 0.400 μm, and 0.550 μm, respectively. These curves also illustrate extremely low values of field curvature and would be understood by a person of ordinary skill in the art of telescope optics to be of very high quality. This is another demonstration of the uniqueness of embodiments in the combination of high-performance, high-resolution, small-aspect-ratio, and even large-FOV of the apparatus 1400.

Figures 17A, 17B:
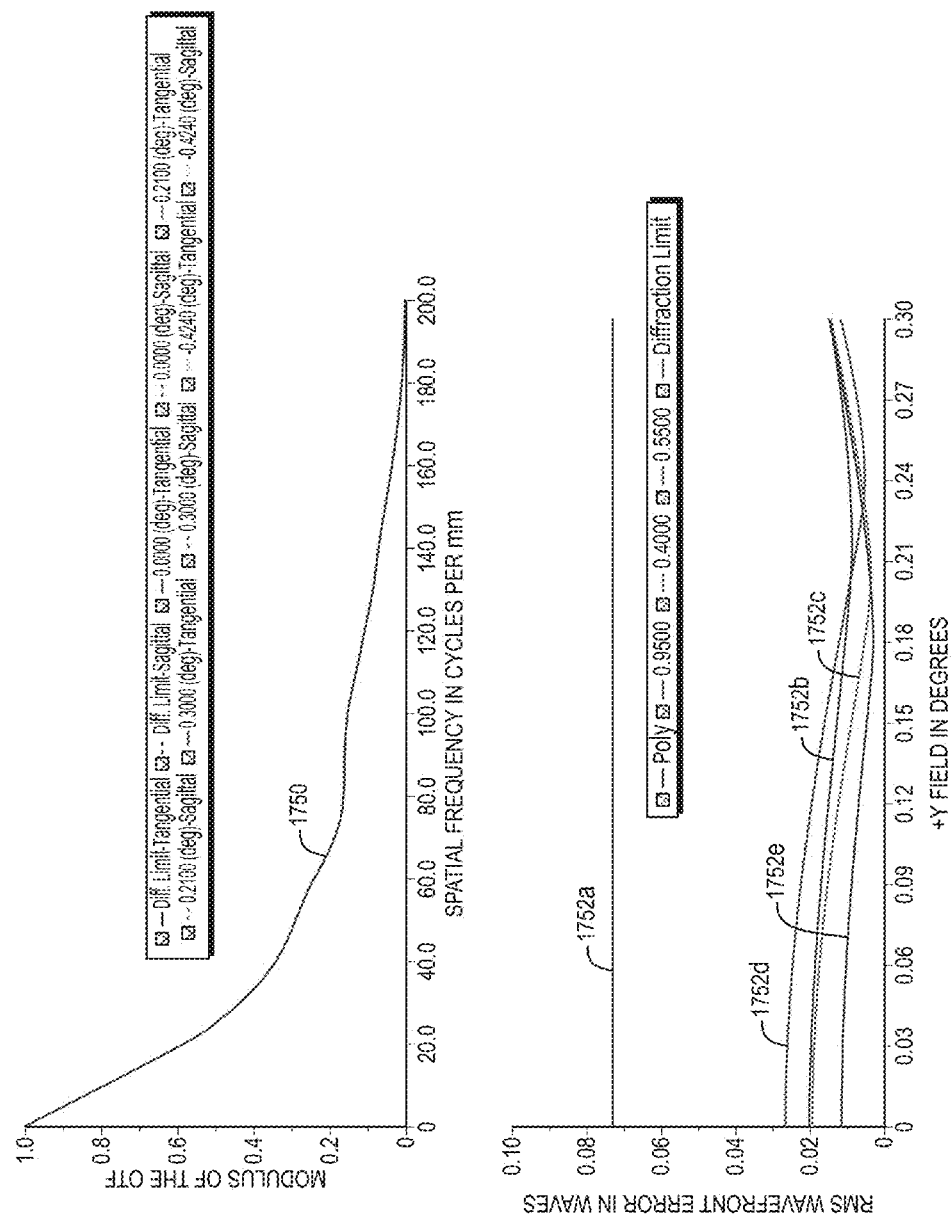
FIG. 17A is a graph showing modulus of the optical transfer function (OTF) as a function of spatial frequency for the embodiment remote imaging apparatus of FIGS. 14A-14B.
FIG. 17B is a graph showing calculated RMS wavefront error as a function of field angle for the embodiment remote imaging apparatus of FIGS. 14A-14B.

FIG. 17A is a graph showing modulus of the optical transfer function (OTF), along the vertical axis, as a function of spatial frequency in cycles per millimeter along the horizontal axis for the apparatus 1400. The modules OTF is shown for various tangential and sagittal field positions of 0.000°, 0.210°, 0.300°, and 0.424°. These plots 1750 are designated all with the same reference number because they fall so close together. This illustrates that the off-axis performance and the on-axis performance are indistinguishable and that the optical performance of the embodiment apparatus 1400 is limited by fundamental diffraction-limited resolution, rather than any defect in the design. There is essentially no chromatic aberration observed, and the performance is diffraction-limited over the entire FOV and wavelength band from 0.400 μm through 0.950 μm.

FIG. 17B is a graph illustrating RMS wavefront error in waves as a function of field angle (in degrees) along the horizontal axis for the apparatus 1400. Curves 752a-e show that the off-axis performance are very similar and that optical performance of the design is limited by fundamental diffraction-limited resolution, rather than any design deficiency at all wavelengths and field angles. The curve below which diffraction becomes the limit is 1752a. Curves 1752c, 1752d, and 1752e are specific to the 0.400 μm, 0.550 μm, and 0.950 μm wavefront errors, respectively, while the curve 1752b is a polychromatic measurement characterizing composite wavelength performance for the three wavelengths, as will be understood by one of ordinary skill in the art of telescope optics.

Figure 18A:
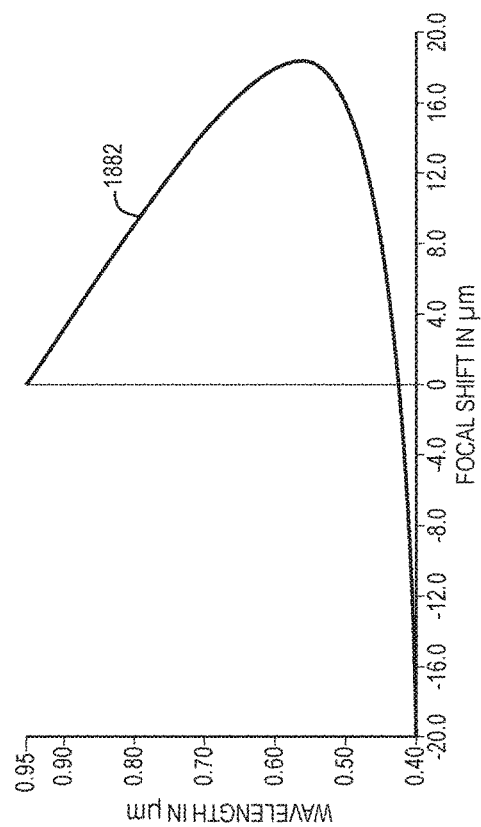
FIG. 18A is a graph showing axial chromatic focal shift for the remote imaging apparatus of FIGS. 14A-14B.

FIG. 18A is a graph showing axial chromatic focal shift calculated by Zemax® for the embodiment apparatus 1400. In particular, a curve 1882 shows calculated focus (focal shift, in microns, along the horizontal axis) as a function of wavelength (in microns, along the vertical axis). This curve illustrates that the shift of focal position for the apparatus 1400 is well within the depth of focus.

Figure 18B:
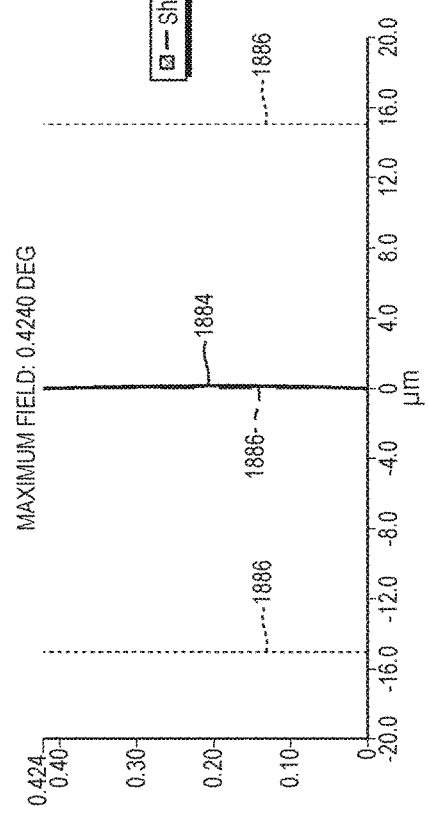
FIG. 18B is a graph showing lateral chromatic shift for the remote imaging apparatus of FIGS. 14A-14B.

FIG. 18B is a graph showing lateral chromatic shift calculated for the apparatus 1400. As will be understood by a person of ordinary skill in the art of telescope optics, lateral chromatic shift is an indication of how much colors blur between on-axis and off-axis positions. Dotted lines 1886 are Airy lines corresponding to the diffraction limit. While curves 1884 and 1886 correspond to the shortest and longest wavelengths calculated for the design, respectively. Because both curves 1884 and 1886 are between the dotted lines, performance of the apparatus 1400 is limited by the diffraction limit, not by distortion resulting from the design.

The following two paragraphs include a detailed Zemax® optical design prescription for the remote imaging apparatus illustrated in FIG. 4. The detailed design prescription in the following two paragraphs is further to the basic design prescription, illustrated and described in connection with FIG. 5, for the same embodiment apparatus. In particular, the first of the two following paragraphs includes general lens data for the lenses of the apparatus 400 in FIG. 4, and the second of the two following paragraphs includes a surface data summary for the surfaces of the apparatus 400.

The detailed design prescription includes certain target wavelengths to which the particular apparatus 400 design is directed. Field angles and first order parameters such as focal lengths of individual mirrors are also included. The general lens data and surface data summary hereinafter will further enable a person of ordinary skill in the art of optical telescope design to make and use the embodiment apparatus of FIG. 4.

| GENERAL LENS DATA | |
|---|---|
| Surfaces | 24 |
| Stop | 1 |
| System Aperture | Entrance Pupil Diameter = 700 |
| Fast Semi-Diameters | On |
| Field Unpolarized | On |
| Convert thin film phase to ray equivalent | On |
| J/E Conversion Method | X Axis Reference |
| Glass Catalogs | RAD_HARDB SCHOTT |
| Ray Aiming | Off |
| Apodization | Uniform, factor = 0.00000E+00 |
| Reference OPD | Exit Pupil |
| Paraxial Rays Setting | Ignore Coordinate Breaks |
| Method to Compute F/# | Tracing Rays |
| Method to Compute Huygens Integral | Force Spherical |
| Print Coordinate Breaks | On |
| Multi-Threading | On |
| OPD Modulo 2 Pi | Off |
| Temperature (C) | 2.00000E+01 |
| Pressure (ATM) | 1.00000E+00 |
| Adjust Index Data To Environment | Off |
| Effective Focal Length | 9100 (in air at system temperature and pressure) |
| Effective Focal Length | 9100 (in image space) |
| Back Focal Length | 32.88601 |
| Total Track | 1029.839 |
| Image Space F/# | 13 |
| Paraxial Working F/# | 13 |
| Working F/# | 13.001 |
| Image Space NA | 0.03843312 |
| Object Space NA | 3.5e−08 |
| Stop Radius | 350 |
| Paraxial Image Height | 67.34301 |
| Paraxial Magnification | 0 |
| Entrance Pupil Diameter | 700 |
| Entrance Pupil Position | 0 |
| Exit Pupil Diameter | 31.49101 |
| Exit Pupil Position | −409.4034 |
| Field Type | Angle in degrees |
| Maximum Radial Field | 0.424 |
| Primary Wavelength [μm] | 0.95 |
| Angular Magnification | 22.22839 |
| Lens Units | Millimeters |
| Source Units | Watts |
| Analysis Units | Watts/cm^2 |
| Afocal Mode Units | milliradians |
| MTF Units | cycles/millimeter |
| Include Calculated Data in Session File | On |
| Fields | 4 |
| Field Type | Angle in degrees |

| # | X-Value | Y-Value | Weight |
|---|---|---|---|
| 1 | 0.000000 | 0.000000 | 1.000000 |
| 2 | 0.000000 | 0.210000 | 1.000000 |
| 3 | 0.000000 | 0.300000 | 1.000000 |
| 4 | 0.000000 | −0.424000 | 0.000000 |

| Wavelengths | 3 |
|---|---|
| Units | μm |

| # | Value | Weight |
|---|---|---|
| 1 | 0.950000 | 1.000000 |
| 2 | 0.400000 | 1.000000 |
| 3 | 0.550000 | 1.000000 |

Surface Data Summary

| Surf | Type | Radius | Thickness | Glass | Clear Diam | Chip Zone | Mech Diam | Conic | Comment |
|---|---|---|---|---|---|---|---|---|---|
| OBJ | STANDARD | Infinity | Infinity | 0 | 0 | 0 | 0 | | |
| STO | STANDARD | Infinity | 693 | | 700 | 0 | 700 | 0 | |
| 2 | STANDARD | −2455.101 | −651.9584 | MIRROR | 709.8774 | 0 | 709.8774 | −1.129462 | |
| 3 | STANDARD | −1219.269 | 651.9584 | MIRROR | 343.60 | 0 | 343.603 | −1.568635 | |
| 4 | STANDARD | −2455.101 | −651.9584 | MIRROR | 342.3512 | 0 | 342.3512 | −1.129462 | |
| 5 | STANDARD | −1219.269 | 651.9584 | MIRROR | 159.3807 | 0 | 159.3807 | −1.568635 | |
| 6 | STANDARD | Infinity | 140 | | 146.6134 | 0 | 146.6134 | 0 | |
| 7 | COORDBRK | — | 0 | | — | | — | — | |
| 8 | STANDARD | Infinity | 0 | MIRROR | 205.4848 | 0 | 205.4848 | 0 | |
| 9 | COORDBRK | — | 0 | | — | | — | — | |
| 10 | STANDARD | Infinity | −140 | | 143.8827 | 0 | 143.8827 | 0 | |
| 11 | STANDARD | Infinity | −49 | | 141.1519 | 0 | 141.1519 | 0 | |
| 12 | STANDARD | Infinity | −98 | | 140.1962 | 0 | 140.1962 | 0 | |
| 13 | COORDBRK | — | 0 | | — | | — | — | |
| 14 | STANDARD | Infinity | 0 | MIRROR | 138.2847 | 0 | 138.2847 | 0 | |
| 15 | COORDBRK | — | 0 | | — | | — | — | |
| 16 | STANDARD | Infinity | 266 | | 138.2847 | 0 | 138.2847 | 0 | |
| 17 | STANDARD | Infinity | 0 | | 133.0963 | 0 | 133.0963 | 0 | |
| 18 | STANDARD | −174.913 | 14 | LAK9G15 | 133.3539 | 0 | 137.7466 | 0 | |
| 19 | STANDARD | −179.8672 | 2.8 | | 137.7466 | 0 | 137.7466 | 0 | |
| 20 | STANDARD | 231.6415 | 28.00001 | F2G12 | 137.1412 | 0 | 137.1412 | 0 | |
| 21 | STANDARD | 248.4584 | 113.5449 | | 130.5938 | 0 | 137.1412 | 0 | |
| 22 | STANDARD | −371.5411 | 26.58783 | F2G12 | 124.0457 | 0 | 127.0526 | 0 | |
| 23 | STANDARD | 688.9365 | 32.90626 | | 127.0526 | 0 | 127.0526 | 0 | |
| IMA | STANDARD | Infinity | 134.6735 | | 0 | 134.6735 | 0 | | |

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A remote imaging apparatus comprising:
   a hyperbolic primary mirror configured to receive light from a remote object to be imaged, the hyperbolic primary mirror having a continuous surface arranged within the remote imaging apparatus and configured to reflect, at least twice, the light from the remote object to be imaged;
   a hyperbolic secondary mirror arranged with an orientation relative to the hyperbolic primary mirror, the hyperbolic secondary mirror having a continuous surface arranged within the remote imaging apparatus and configured to reflect, at least twice, the light from the remote object to be imaged, the hyperbolic secondary mirror further configured to deliver the light to a field corrector; and
   wherein the field corrector is arranged to receive the light reflected from the hyperbolic secondary mirror via a port of the hyperbolic primary mirror, and wherein the field corrector is configured to correct for an optical aberration of one or both of the hyperbolic primary and secondary mirrors.

2. The apparatus of claim 1, further defined by an aspect ratio of a mirror separation between the respective continuous surfaces of the hyperbolic primary and secondary mirrors divided by a diameter of the hyperbolic primary mirror, and wherein the aspect ratio is in a range of about 0.3 to about 3.0.

3. The apparatus of claim 2, wherein the aspect ratio is in a range of about 0.3 to about 2.0.

4. The apparatus of claim 3, wherein the aspect ratio is in a range of about 0.3 to about 1.2.

5. The apparatus of claim 4, wherein the aspect ratio is in a range of about 0.8 to about 1.2.

6. The apparatus of claim 1, wherein the apparatus has an F-Tan(Theta) distortion within a range of about 0.001% to about 3% over a wavelength range of 400-2100 nanometers (nm).

7. The apparatus of claim 6, wherein the apparatus has an F-Tan(Theta) distortion within a range of about 0.1% to about 1% over the wavelength range of 400-2100 nm.

8. The apparatus of claim 1, wherein the hyperbolic primary and secondary mirrors and the field corrector together are configured to output a diffraction-limited image of the remote object.

9. The apparatus of claim 1, wherein the field corrector is configured to impart a telephoto magnification to an image of the object to be imaged.

10. The apparatus of claim 1, wherein the field corrector is a two-lens corrector, a three-lens corrector, a four-lens corrector, a sapphire doublet, or an achromatic triplet.

11. The apparatus of claim 1, wherein the field corrector includes fused silica or a radiation-hardened glass.

12. The apparatus of claim 1, further comprising one or more folding mirrors configured to fold the light from the remote object in an optical path between the hyperbolic secondary mirror and the field corrector.

13. The apparatus of claim 1, further comprising a pixel array arranged to receive the light from the field corrector to capture an image of the remote object to be imaged.

14. The apparatus of claim 1, wherein the hyperbolic primary mirror has an input aperture in a range of between about 100 mm and about 5 m.

15. The apparatus of claim 1, wherein the apparatus has a field of view (FOV) in a range of about 0.1 degrees to about 0.5 degrees or an effective focal length (EFL) in a range of about 7 meters (m) to about 15 m.

16. The apparatus of claim 1, further defined by an f/# between about f/8 and about f/100.

17. The apparatus of claim 16, further defined by an f/# between about f/13 and about f/25.

18. A tracking system comprising the apparatus of claim 1, the tracking system further comprising one or more actuators configured to slew the apparatus angularly for repeated imaging of the remote object, with relative motion between the remote object and the tracking system.

19. A method of remote imaging, the method comprising:
- receiving, at a hyperbolic primary mirror having a continuous surface, light from a remote object to be imaged;
- reflecting, at least twice, at the continuous surface of the hyperbolic primary mirror, the light from the remote object to be imaged, the hyperbolic primary mirror arranged and configured to perform the reflecting at the hyperbolic primary mirror;
- receiving, at a hyperbolic secondary mirror having a continuous surface, light from the remote object to be imaged;
- reflecting, at least twice, at the continuous surface of the hyperbolic secondary mirror, the light from the remote object to be imaged, the hyperbolic secondary mirror arranged and configured to perform the reflecting at the hyperbolic secondary mirror; and
- delivering the light from the hyperbolic secondary mirror, via a port of the hyperbolic primary mirror, to a field corrector configured to correct for an optical aberration of one or both of the hyperbolic primary and secondary mirrors.

* * * * *